United States Patent
Dubtsov et al.

(10) Patent No.: US 11,023,231 B2
(45) Date of Patent: Jun. 1, 2021

(54) SYSTEMS AND METHODS FOR EXECUTING A FUSED MULTIPLY-ADD INSTRUCTION FOR COMPLEX NUMBERS

(71) Applicant: Intel Corporation, Santa Clara, CA (US)

(72) Inventors: Roman S. Dubtsov, Novosibirsk (RU); Robert Valentine, Kiryat Tivon (IL); Jesus Corbal, Barcelona (ES); Milind Girkar, Sunnyvale, CA (US); Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 15/283,384

(22) Filed: Oct. 1, 2016

(65) Prior Publication Data

US 2018/0095758 A1    Apr. 5, 2018

(51) Int. Cl.
*G06F 9/302* (2018.01)
*G06F 9/30* (2018.01)

(52) U.S. Cl.
CPC ........ *G06F 9/30036* (2013.01); *G06F 9/3001* (2013.01)

(58) Field of Classification Search
CPC ... G06F 7/4812; G06F 9/3001; G06F 9/30036
USPC ................................. 708/523, 622
See application file for complete search history.

(56) References Cited

U.S. PATENT DOCUMENTS

| | | | |
|---|---|---|---|
| 5,778,241 A * | 7/1998 | Bindloss | G06F 9/30014 712/20 |
| 7,072,929 B2 * | 7/2006 | Pechanek | G06F 7/4812 708/622 |
| 7,546,330 B2 * | 6/2009 | Taunton | G06F 7/4812 708/511 |
| 9,104,510 B1 * | 8/2015 | Rub | G06F 7/483 |

(Continued)

OTHER PUBLICATIONS

Luo et al., "Architecture and Implementation of a Vector MAC Unit for Complex Number", IEEE, 2014, pp. 589-594.*

(Continued)

*Primary Examiner* — David J. Huisman
(74) *Attorney, Agent, or Firm* — Nicholson De Vos Webster & Elliott LLP

(57) ABSTRACT

Disclosed embodiments relate to executing a vector-complex fused multiply-add Instruction. In one example, a method includes fetching an instruction, a format of the instruction including an opcode, a first source operand identifier, a second source operand identifier, and a destination operand identifier, wherein each of the identifiers identifies a location storing a packed data comprising at least one complex number, decoding the instruction, retrieving data associated with the first and second source operand identifiers, and executing the decoded instruction to, for each packed data element position of the identified first and second source operands, cross-multiply the real and imaginary components to generate four products: a product of real components, a product of imaginary components, and two mixed products, generate a complex result by using the four products according to the instruction, and store a result to the corresponding position of the identified destination operand.

20 Claims, 23 Drawing Sheets

(56) References Cited

U.S. PATENT DOCUMENTS

| | | | |
|---|---|---|---|
| 9,104,584 B2 * | 8/2015 | Park | G06F 17/10 |
| 2002/0004809 A1 | 1/2002 | Golliver et al. | |
| 2008/0270768 A1 | 10/2008 | Khan et al. | |
| 2009/0055455 A1 | 2/2009 | Matsuyama et al. | |
| 2012/0166511 A1 | 6/2012 | Hiremath et al. | |
| 2013/0305020 A1 * | 11/2013 | Valentine | G06F 9/3001 |
| | | | 712/208 |
| 2015/0019842 A1 | 1/2015 | Rahman et al. | |

OTHER PUBLICATIONS

International Search Report and Written Opinion for Application No. PCT/US2017/046036, dated Nov. 22, 2017, 14 pages.

* cited by examiner

| OPCODE 202 | FIRST SOURCE OPERAND IDENTIFIER 204 | SECOND SOURCE OPERAND IDENTIFIER 206 | DESTINATION OPERAND IDENTIFIER 208 |

| OPCODE 252 | FIRST SOURCE OPERAND IDENTIFIER 254 | SECOND SOURCE OPERAND IDENTIFIER 256 | DESTINATION OPERAND IDENTIFIER 258 | WRITEMASK 260 |

600

VCF[C]MADD (Vector-Complex Fused [Conjugated] Multiply Add)

VLEN = 16;

VCF[C]MADD (SRC1[0:15], SRC2[0:15]; DST[0:15])

```
FOR J = 0, VLEN-1, 2
     IF VCFMADD
     THEN
          DST[J+0] += SRC1[J+0]*SRC2[J+0] - SRC1[J+1]*SRC2[J+1];
          DST[J+1] += SRC1[J+1]*SRC2[J+0] + SRC1[J+0]*SRC2[J+1];
     ELSE   /* VCFCMADD
          DST[J+0] += SRC1[J+0]*SRC2[J+0] + SRC1[J+1]*SRC2[J+1]
          DST[J+1] += SRC1[J+1]*SRC2[J+0] - SRC1[J+0]*SRC2[J+1]
     FI
ENDFOR
```

VCFMADD (Vector Complex Fused Multiply Add)

VLEN = 16;
MaskBit = 0XFF;

VCFMADD (SRC1[0:15], SRC2[0:15]; DST[0:15])

FOR J = 0, VLEN-1, 2
    IF MaskBit[J/2] or *no write mask*
    THEN
        DST[J+0] += SRC1[J+0]*SRC2[J+0] - SRC1[J+1]*SRC2[J+1];
        DST[J+1] += SRC1[J+1]*SRC2[J+0] + SRC1[J+0]*SRC2[J+1];
    ELSE
        IF *merging-masking*
        THEN
            *DST[J+0] and DST[J+1] remain unchanged*;
        ELSE
            DST[J+0] = 0;
            DST[J+1] = 0;
        FI
    FI
ENDFOR

VCFCMADD (Vector Complex Fused Conjugated Multiply Add)

VLEN = 16;
MaskBit = 0XFF;

VCFCMADD (SRC1[0:15], SRC2[0:15]; DST[0:15])

FOR J = 0, VLEN-1, 2
    IF MaskBit[J/2] or *no write mask*
    THEN
        DST[J+0] += SRC1[J+0]*SRC2[J+0] + SRC1[J+1]*SRC2[J+1]
        DST[J+1] += SRC1[J+1]*SRC2[J+0] - SRC1[J+0]*SRC2[J+1]
    ELSE
        IF *merging-masking*
        THEN
            *DST[J+0] and DST[J+1] remain unchanged*
        ELSE
            DST[J+0] = 0
            DST[J+1] = 0
        FI
    FI
ENDFOR

FIG. 8

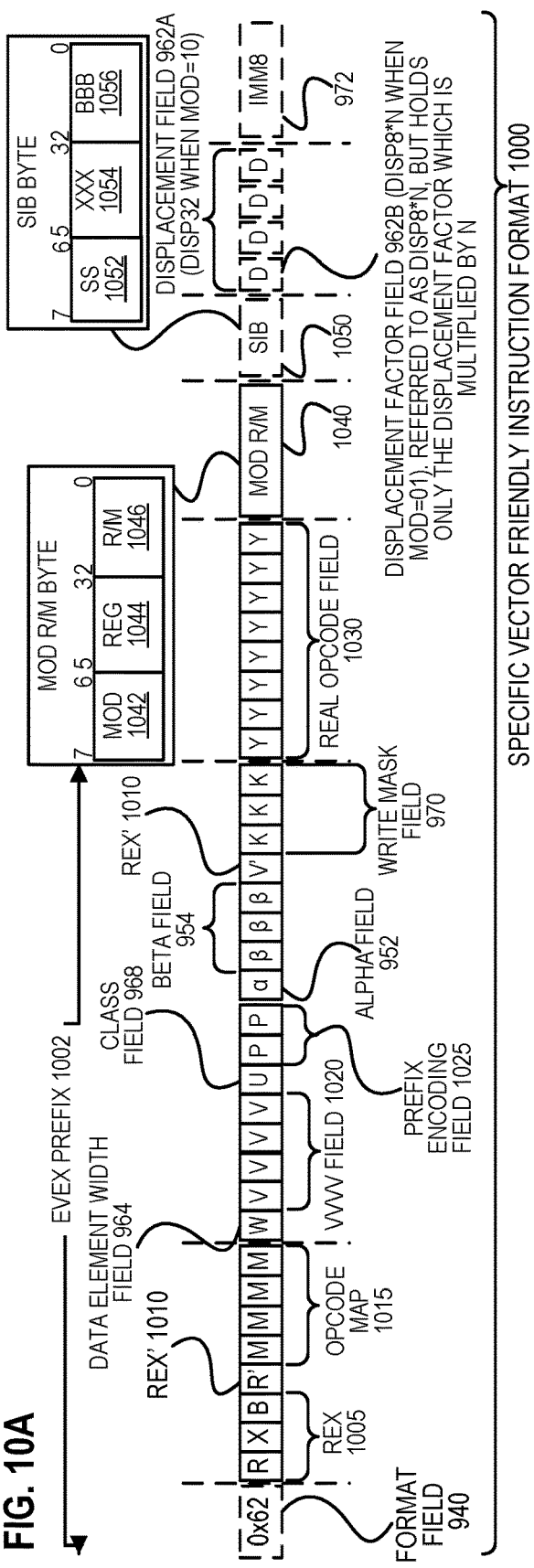
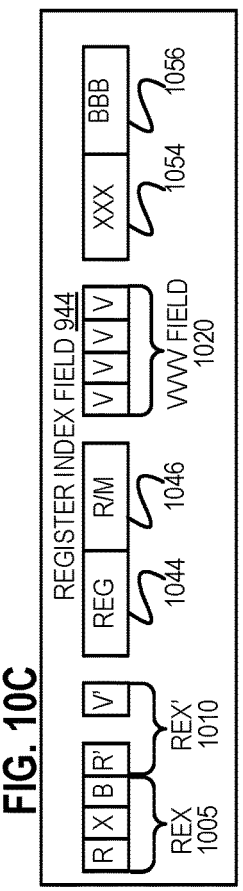
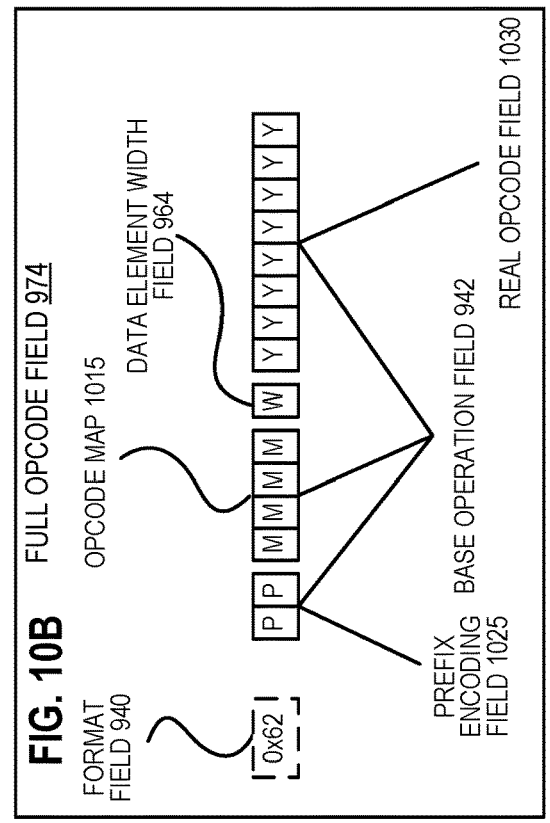

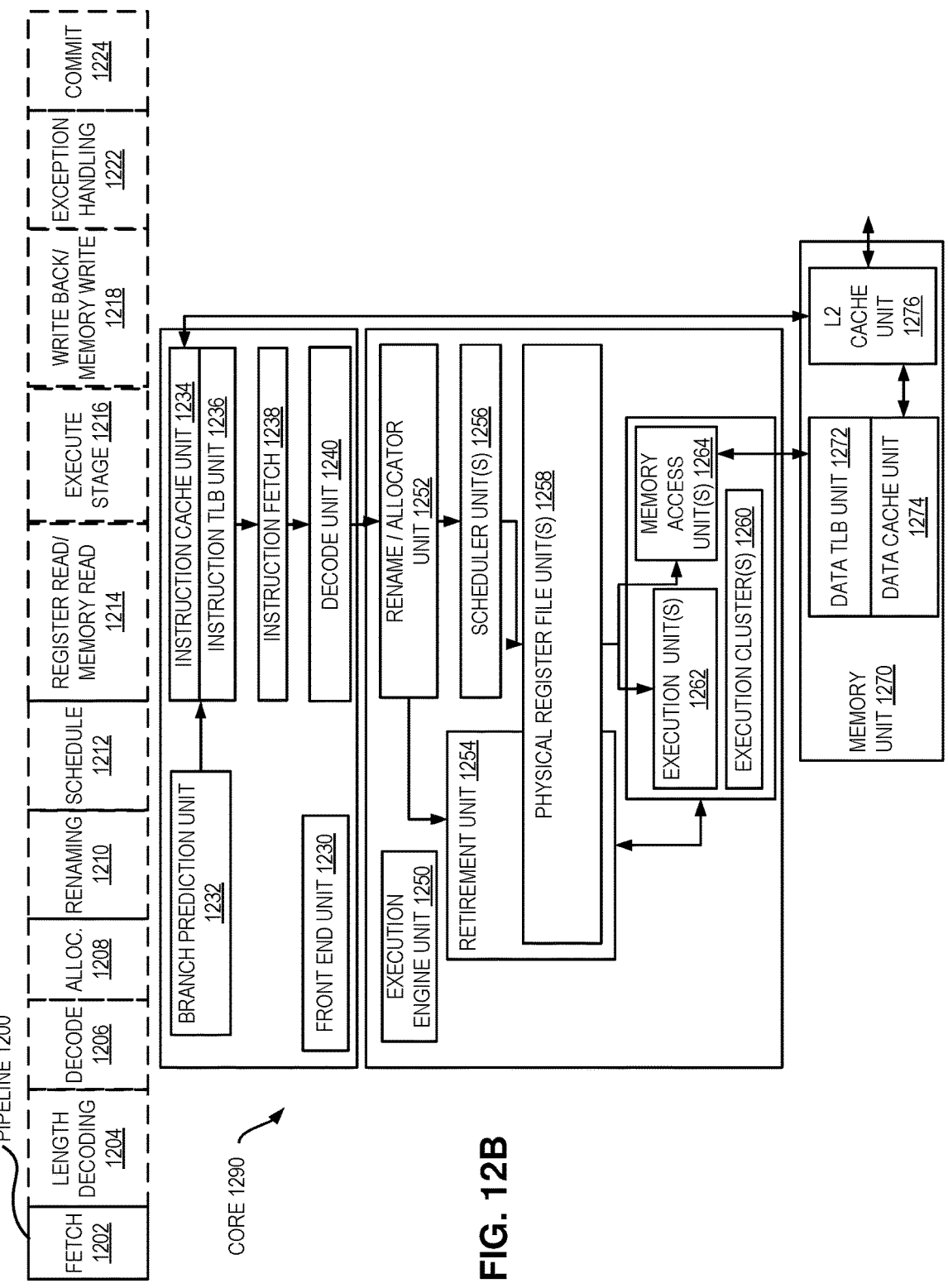

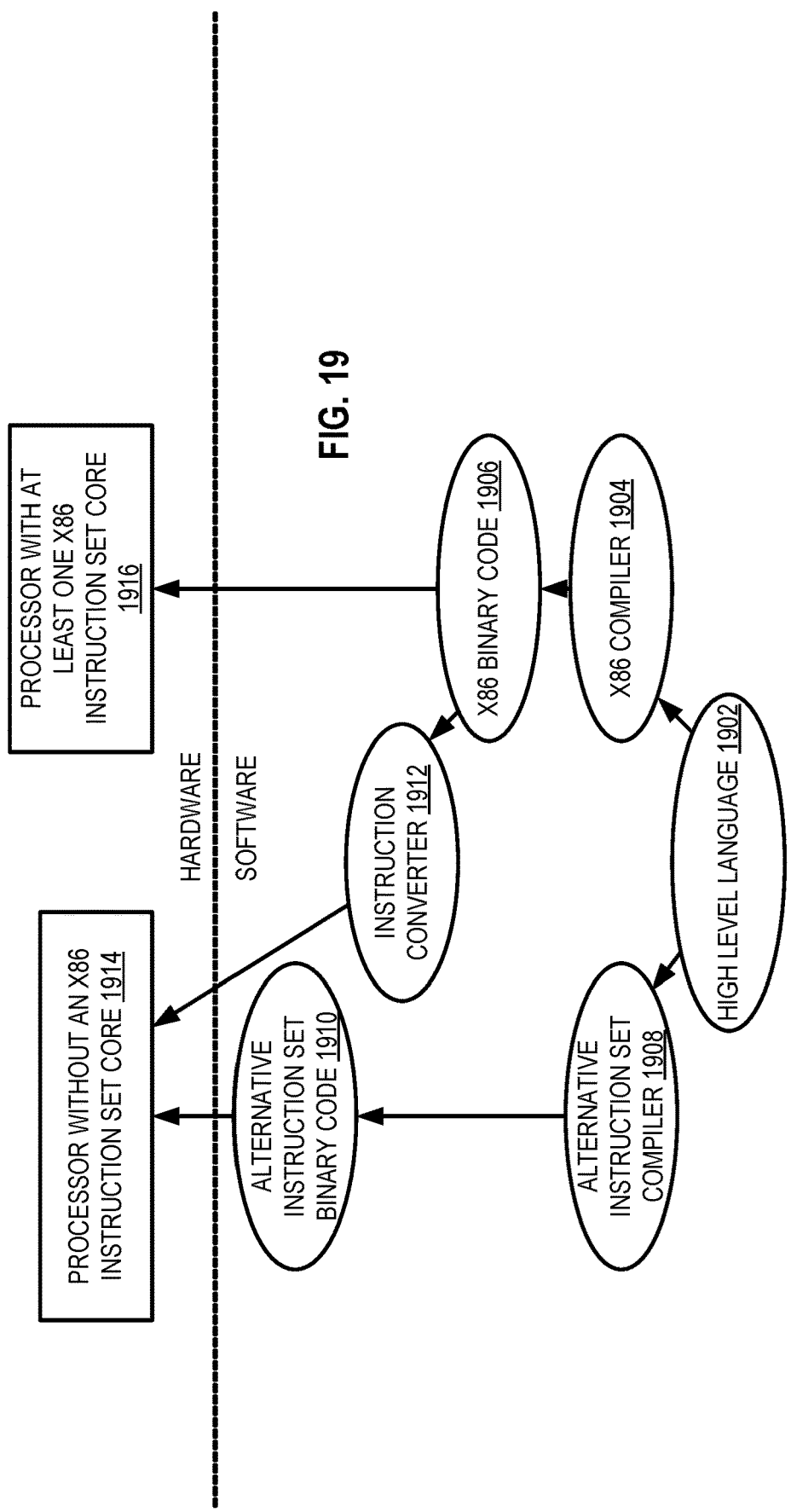

SYSTEMS AND METHODS FOR EXECUTING A FUSED MULTIPLY-ADD INSTRUCTION FOR COMPLEX NUMBERS

TECHNICAL FIELD

Embodiments described herein generally relate to an instruction set architecture. In particular, embodiments described generally relate to systems and methods for executing a fused multiply-add Instruction for complex numbers.

BACKGROUND INFORMATION

In computing, especially in high-performance computing, instructions that perform complex multiplication and accumulation are common. A processor's instruction set architecture often includes instructions to perform complex arithmetic. Since such instructions are common, improvements to performance and power consumption, including reduced register file pressure, reduced memory pressure, and reduced number of required instructions may benefit overall performance.

BRIEF DESCRIPTION OF THE DRAWINGS

The various advantages of the embodiments disclosed herein will become apparent to one skilled in the art by reading the following specification and appended claims, and by referencing the drawings, in which:

FIG. 2A illustrates fields included in an instruction to multiply two packed or scalar complex numbers and accumulate the result according to one embodiment, FIG. 2B illustrates fields included in an instruction to multiply two packed or scalar complex numbers and accumulate the result using a writemask according to one embodiment.

FIG. 6 is pseudocode to illustrate operation of an execution circuit to implement a VCFMADD instruction according to one embodiment, FIG. 7 is pseudocode to illustrate operation of an execution circuit to implement a VCFMADD instruction according to one embodiment, FIG. 8 is pseudocode to illustrate operation of an execution circuit to implement a VCFCMADD instruction according to one embodiment, FIG. 9A is a block diagram illustrating a generic vector friendly instruction format and class A instruction templates thereof according to embodiments of the invention, FIG. 9B is a block diagram illustrating the generic vector friendly instruction format and class B instruction templates thereof according to embodiments of the invention, FIG. 10A is a block diagram illustrating an exemplary specific vector friendly instruction format according to embodiments of the invention, FIG. 10B is a block diagram illustrating the fields of the specific vector friendly instruction format that make up the full opcode field 974 according to one embodiment of the invention, FIG. 10C is a block diagram illustrating the fields of the specific vector friendly instruction format that make up the register index field 944 according to one embodiment of the invention, FIG. 12A is a block diagram illustrating both an exemplary in-order pipeline and an exemplary register renaming, out-of-order issue/execution pipeline according to embodiments of the invention, FIG. 12B is a block diagram illustrating both an exemplary embodiment of an in-order architecture core and an exemplary register renaming, out-of-order issue/execution architecture core to be included in a processor according to embodiments of the invention, FIG. 13A is a block diagram of a single processor core, along with its connection to the on-die interconnect network 1302 and with its local subset of the Level 2 (L2) cache 1304, according to embodiments of the invention, FIG. 13B is an expanded view of part of the processor core in FIG. 13A according to embodiments of the invention, FIG. 16 is a block diagram of a first more specific exemplary system in accordance with an embodiment of the present invention, FIG. 17 is a block diagram of a second more specific exemplary system in accordance with an embodiment of the present invention, FIG. 18 is a block diagram of a SoC in accordance with an embodiment of the present invention, and FIG. 19 is a block diagram contrasting the use of a software instruction converter to convert binary instructions in a source instruction set to binary instructions in a target instruction set according to embodiments of the invention.

DETAILED DESCRIPTION OF THE EMBODIMENTS

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor's instruction set architecture often includes instructions to perform complex arithmetic. Instructions that perform complex multiplication and accumulation are common, especially in high-performance computing (HPC). Some processors' instruction set architectures (ISA), such as AVX512 or earlier x86 SIMD ISAs, support instruction sequences for complex number multiplication, but often require many instructions. Using many instructions to perform a common multiply-accumulate operation yields low performance and relatively high power consumption because the instruction sequences exert register file pressure, memory pressure.

Embodiments disclosed herein disclose instructions to perform fused complex multiplication and addition using fewer machine resources and less register file pressure and memory pressure. In one embodiment, an instruction performs multiplication of two vectors of complex numbers and accumulation of the result in the destination vector. In another embodiment, an instruction conjugates numbers in one of the input vectors (conjugation of a complex number is changing the sign of its imaginary part).

In some embodiments of the disclosed fused multiply add instruction, Instruction arguments can be either registers or memory. Complex numbers are stored in a natural form as (real, imaginary) pairs. The instructions allow double, single or half-precision implementations.

Advantage of the disclosed instructions over other instruction set architectures, such as AVX512 or earlier x86 SIMD ISAs, include higher performance and lower power due to reduced register file pressure, reduced memory pressure and reduced number of instructions needed for a common arithmetic operation.

Figure 1:
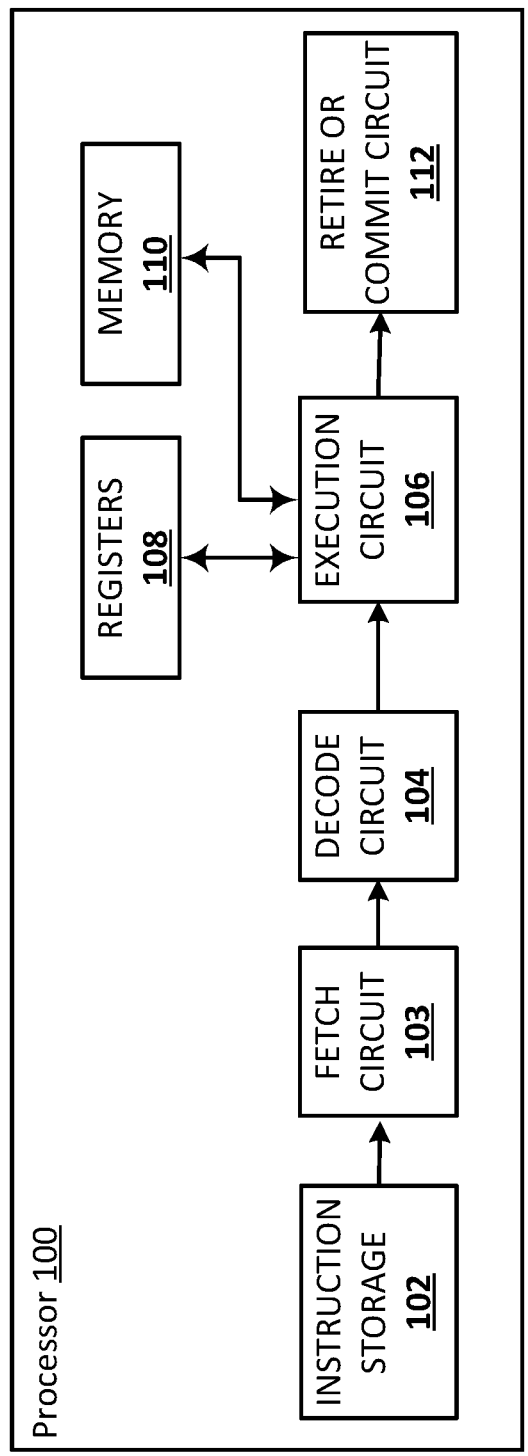
FIG. 1 is a block diagram illustrating processing components for executing an instruction to multiply two packed or scalar complex numbers and accumulate the result according to one embodiment.

FIG. 1 is a block diagram illustrating processing components for executing an instruction to multiply two packed or scalar complex numbers and accumulate the result according to one embodiment. Specifically, block diagram 100 includes instruction storage 102, fetch circuit 103, decode circuit 104, execution circuit 106, registers 108, memory 110, and retire or commit circuit 112. An instruction is fetched by fetch circuit 103 from instruction storage 102, which comprises a cache memory, an on-chip memory, a memory on the same die as the processor, an instruction register, a general register, or system memory, without limitation. Decode circuit 104 decodes the instruction. In one embodiment, the instruction comprises fields discussed further below with respect to FIGS. 2A-2B. The decoded instruction is executed by execution circuit 106. Execution circuit 106 is configured to read data from and write data to registers 108 and memory 110. Registers 108 comprise any one or more of a data register, an instruction register, a general register, and an on-chip memory. Memory 110 comprises any one or more of an on-chip memory, a memory on the same die as the processor, a memory in the same package as the processor, a cache memory, and system memory. Several exemplary embodiments of execution circuit 106 are described and illustrated with respect to FIG. 3-FIG. 8. Retire or commit circuit 112 ensures that execution results are written to or have been written to their destinations, and frees up or releases resources for later use.

Figure 2A:
FIGS. 2A-2B illustrate fields included in an instruction to multiply two packed or scalar complex numbers and accumulate the result according to some embodiments.
Figure 10D:
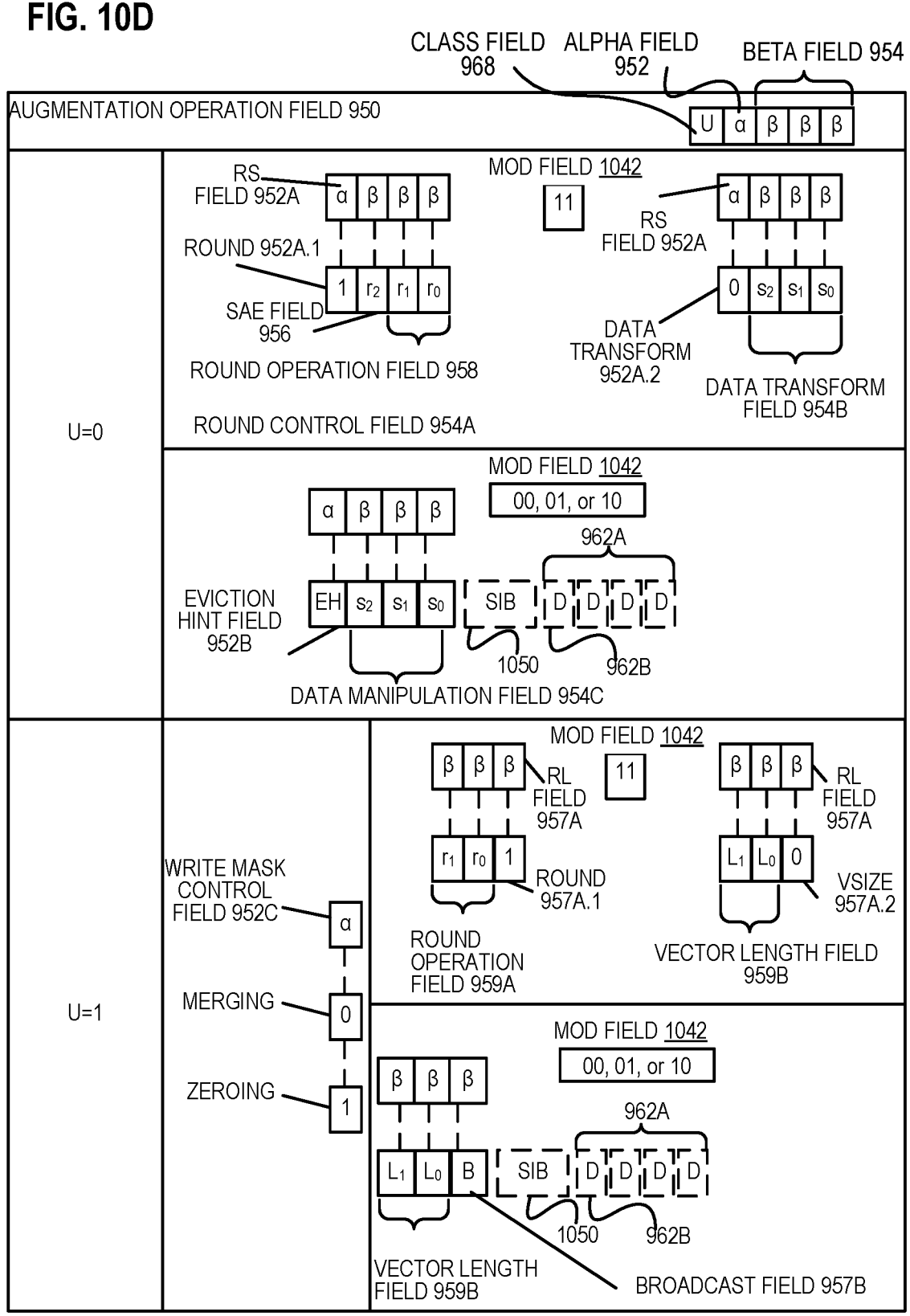
FIG. 10D is a block diagram illustrating the fields of the specific vector friendly instruction format that make up the augmentation operation field 950 according to one embodiment of the invention.

FIG. 2A illustrates fields included in an instruction to multiply two packed or scalar complex numbers and accumulate the result according to one embodiment. Specifically, instruction 200 includes opcode 202, first source operand identifier 204, second source operand identifier 206, and destination operand identifier 208. Opcode 202 identifies the instruction and/or the operation to be performed, as well as the type of operands (e.g., instruction to multiply and accumulate a first source operand stored in the register file as shown in FIG. 10D). The first source operand identifier 204 contains the first source operand (a packed complex number, or packed vector data) or identifies a register or memory location from which to retrieve the first source operand. In some embodiments, the first source operand includes a plurality of vector data elements, each of which includes a pair of numbers: the real and imaginary components of a complex number Each element in the first source operand has a corresponding element in a second source operand, specified by the second source operand identifier 206, and a corresponding element in a destination operand, specified by the destination operand identifier 208. Because the second source operand and the destination operand correspond to the first source operand, their minimum sizes depend on the size of the first source operand. For example, if the first source operand contains 8 elements, the destination operand will contain a minimum of 8 elements, and the second source operand will contain at least 8 elements, each containing a pair of numbers representing real and imaginary components of a complex number. As another example, if the first source operand contains 64 elements, the destination operand will contain a minimum of 64 elements, and the second source operand will contain at least 64 elements, each containing a pair of numbers representing real and imaginary components of a complex number.

The first and second source operands and the destination operand identified by 204, 206, and 208 are stored in registers of a register set or in memory. The register set is part of a register file, along with potentially other registers, such as status registers, flag registers, dedicated mask registers, vector registers, etc. One embodiment of a register file is shown in FIG. 10D. The registers are visible from the outside of the processor or from a programmer's perspective. In one embodiment, instructions specify operands stored in the registers. Various different types of registers are suitable, as long as they are capable of storing and providing data as described herein. Alternatively, one or more of the source and destination operands are stored in a storage location other than a register, such as, for example, a location in system memory.

Figure 2B:

FIG. 2B illustrates fields included in an instruction to multiply two packed or scalar complex numbers and accumulate the result using a writemask according to one embodiment. Specifically, instruction 250 includes opcode 252, first source operand identifier 254, second source operand identifier 256, destination operand identifier 258, and writemask 260. Opcode 252 identifies the instruction and/or the operation to be performed, as well as the type of operands (e.g., instruction to multiply and accumulate a first source operand stored in the register file as shown in FIG. 10D). The first source operand identifier 254 contains the first source operand (a packed complex number, or packed vector data) or identifies a register or memory location from which to retrieve the first source operand. In some embodiments, the first source operand includes a plurality of vector data elements, each of which includes a pair of numbers: the real and imaginary components of a complex number Each element in the first source operand has a corresponding element in a second source operand, specified by the second source operand identifier 256, and a corresponding element in a destination operand, specified by the destination operand identifier 258. Because the second source operand and the destination operand correspond to the first source operand, their minimum sizes depend on the size of the first source operand. For example, if the first source operand contains 8 elements, the destination operand will contain a minimum of 8 elements, and the second source operand will contain at least 8 elements, each containing a pair of numbers representing real and imaginary components of a complex number. As another example, if the first source operand contains 64 elements, the destination operand will contain a minimum of 64 elements, and the second source operand will contain at least 64 elements, each containing a pair of numbers representing real and imaginary components of a complex number.

The first and second source operands and the destination operand identified by fields 254, 256, and 258 are stored in registers of a register set or in memory. This embodiment includes writemask 260, which is used to control which vector elements of the destination operand are to be written. In some embodiments, a 0 bit in the write mask causes the corresponding destination element to retain the value that it had before the instruction. In other embodiments, a 0 bit causes the corresponding vector element of the destination to be set to 0. As used herein, a destination element in the Nth position of the destination vector corresponds to the bit at the Nth position of the writemask. The register set is part of a register file, along with potentially other registers, such as status registers, flag registers, dedicated mask registers, vector registers, etc. One embodiment of a register file is shown in FIG. 10D. The registers are visible from the outside of the processor or from a programmer's perspective. In one embodiment, instructions specify operands stored in the registers. Various different types of registers are suitable, as long as they are capable of storing and providing data as described herein. Alternatively, one or more of the source and destination operands are stored in a storage location other than a register, such as, for example, a location in system memory.

Figure 3:
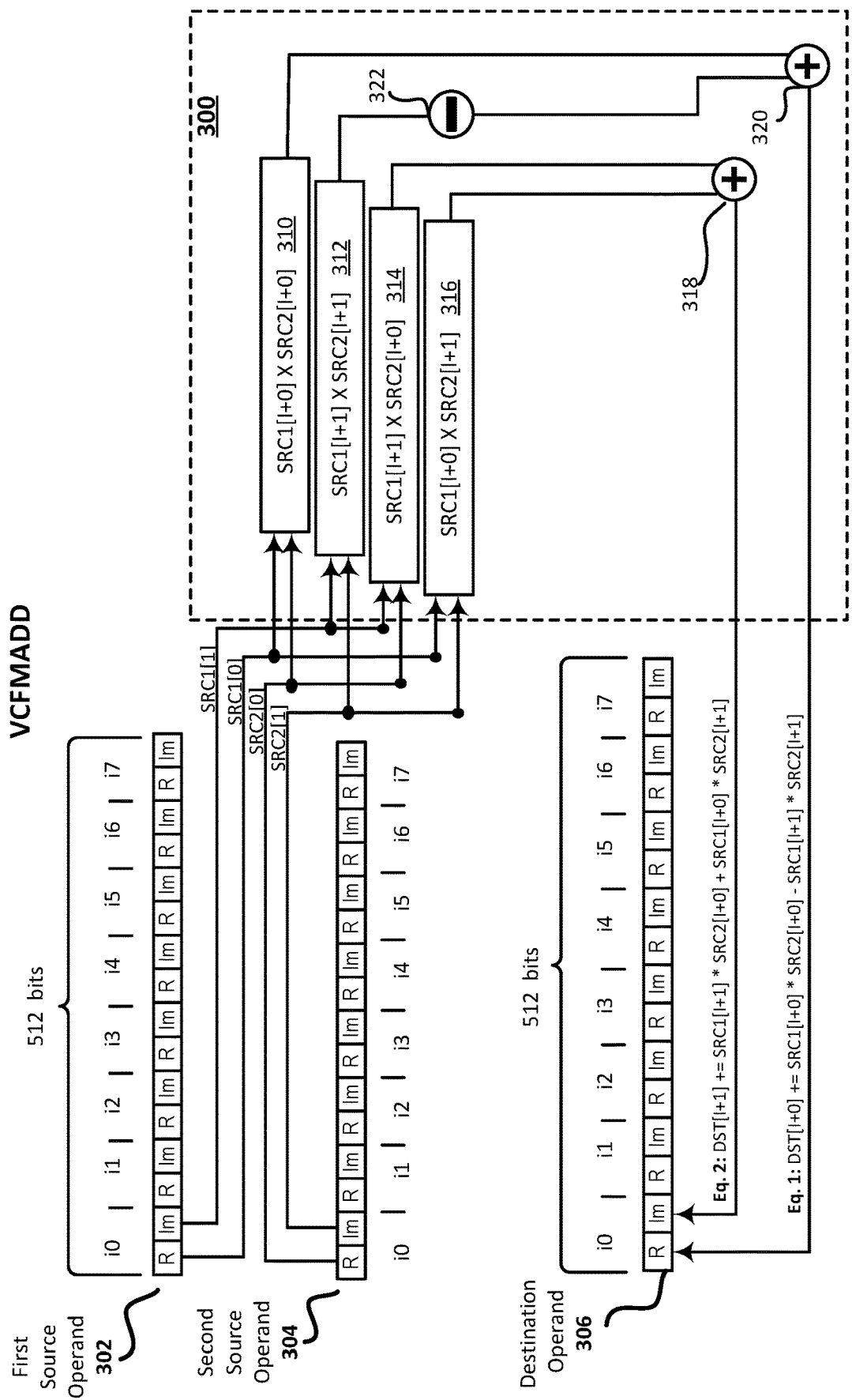
FIG. 3 is an execution circuit to implement a VCFMADD instruction to multiply two packed complex numbers and accumulate the result according to one embodiment.

FIG. 3 illustrates execution circuit 300 to implement a Vector-Complex Fused Multiply Add (VCFMADD) instruction to multiply two packed complex numbers and accumulate the result according to one embodiment. Execution circuit 300 is one embodiment of execution circuit 106 (FIG. 1). As shown, first source operand 302 and second source operand 304 are 512-bit vector registers, each packed with 8 64-bit complex numbers, each consisting of a 32-bit real component and a 32-bit imaginary component. In alternate embodiments, the first and second source operands have different sizes, for example, 32-bits, 128-bits or 256-bits. In alternate embodiments, the first and second source operands are packed with different numbers of elements, for example, 4, 16 or 32 elements. In some embodiments, the VCFMADD instruction includes source operand identifiers that identify memory locations. In some embodiments, when a source operand identifier identifies a memory location, a full vector is retrieved from memory and stored in a vector register for use by execution circuit 300. In other embodiments, when a source operand identifier identifies a memory location, a single element is retrieved from memory and broadcasted to the full vector length of a vector register for use by execution circuit 300. In some embodiments, a source operand identifier identifies a register whose contents are broadcasted to the full vector length of a vector register for use by execution circuit 300.

Execution circuit 300 is an example implementation of execution circuit 106 (FIG. 1). As shown, execution circuit 300 includes multipliers 310, 312, 314, and 316, that together with adders 318 and 320, and sign inverter 322, operate on the first element (first packed vector element position which is a complex number element position) of first source operand 302, identified by i0, and the first element of the second source operand 304, also identified by i0, to produce the first element of destination operand 306, also identified by i0. In particular, the corresponding element of destination operand 306 consists of two numbers that are set according to a VCFMADD computation using Equation 1 and Equation 2.

$$DST[I+0] \mathrel{+}= SRC1[I+0]*SRC2[I+0] - SRC1[I+1]*SRC2[I+1] \qquad \text{Equation 1:}$$

$$DST[I+1] \mathrel{+}= SRC1[I+1]*SRC2[I+0] + SRC1[I+0]*SRC2[I+1] \qquad \text{Equation 2:}$$

In other words, Equations 1 and 2 calculate the real and imaginary components of each destination complex number. For ease of understanding, the VCFMADD computation can be restated without the indices for a single destination complex number according to Equation 1A and Equation 1B:

$$DST.\text{real} \mathrel{+}= SRC1.\text{real}*SRC2.\text{real} - SRC1.\text{imag}*SRC2.\text{imag} \qquad \text{Equation 1A:}$$

$$DST.\text{imag} \mathrel{+}= SRC1.\text{imag}*SRC2.\text{real} + SRC1.\text{real}*SRC2.\text{imag} \qquad \text{Equation 2A:}$$

Although FIG. 3 only shows execution circuit 300 for producing element i0 of destination operand 306, it should be understood that the multipliers, adder, and subtractor are replicated in some embodiments to calculate at least two elements of destination operand 306 in parallel. One embodiment replicates the multipliers, adder, and subtractor to the extent necessary to calculate every element of the destination operand in parallel. The number of destination operand elements calculated and produced in parallel can be varied, for example 2-at-a-time, or 4-at-a-time, or any number of elements at a time.

An embodiment of a serial implementation of VCFMADD, on the other hand, includes circuitry to calculate one element of the destination operand at a time. In serial embodiments, elements of destination operand 306 are calculated and set serially, calculating and setting one element of destination operand 306 at a time, which has the benefit of requiring less execution circuitry.

Some embodiments include parallel hardware circuitry to allow the execution circuit 300 to calculate and set elements of destination operand 306 in one clock cycle. Other embodiments include parallel hardware circuitry to allow execution circuit 300 to calculate and set elements of destination operand 306 in a few clock cycles. Compared to using scalar operations to perform the functionality of the VCFMADD instruction, these embodiments illustrated in FIG. 3 is performed more quickly.

Figure 4:
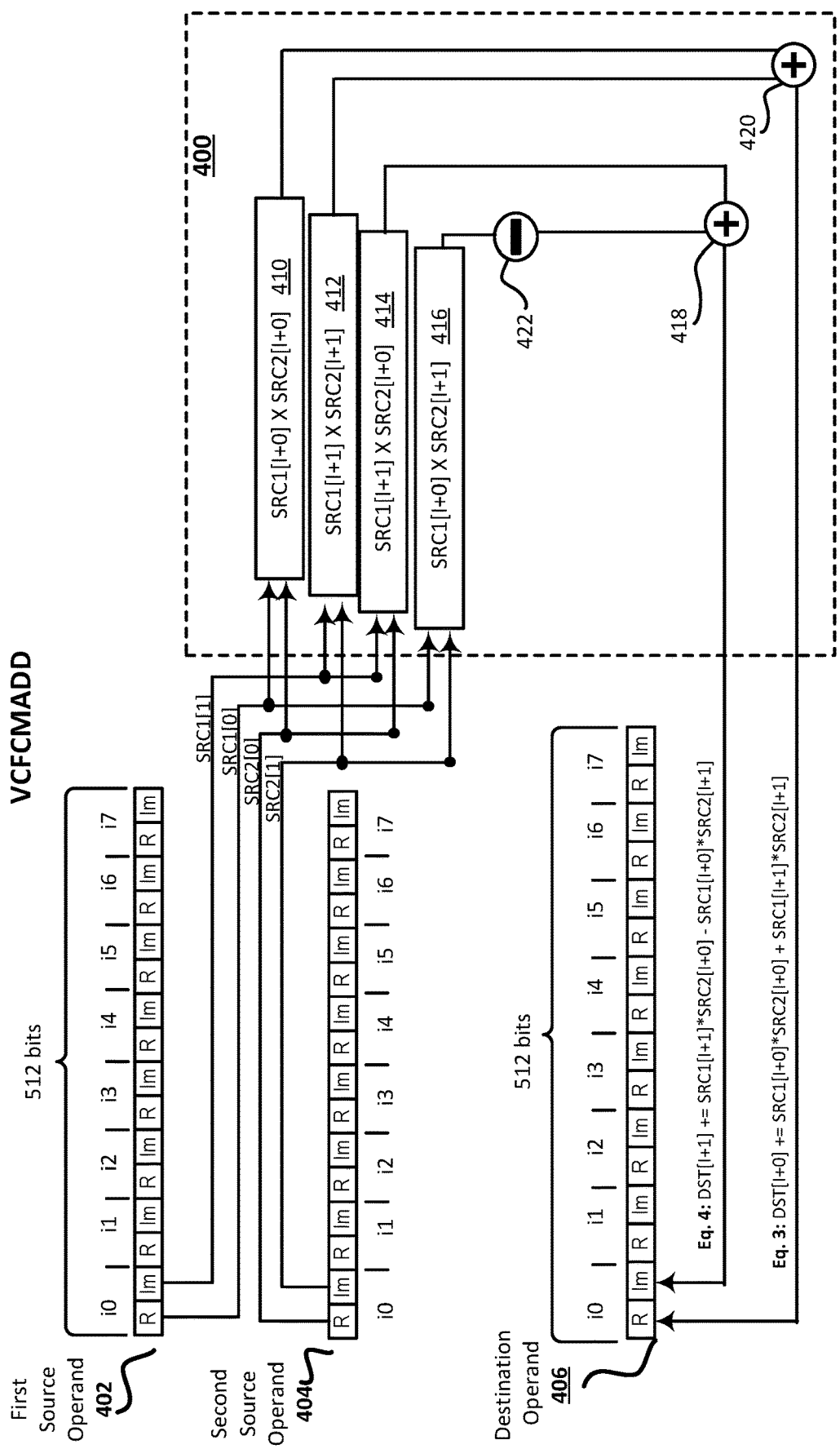
FIG. 4 is an execution circuit to implement a VCFCMADD instruction to multiply two packed complex numbers and accumulate the result according to one embodiment.

FIG. 4 illustrates execution circuit 400 used to implement a Vector-Complex Fused Conjugated Multiply Add (VCFC-MADD) instruction to multiply two packed complex numbers and accumulate the result according to one embodiment. Execution circuit 400 is one embodiment of execution circuit 106 (FIG. 1). As shown, first source operand 402 and second source operand 404 are 512-bit vector registers, each packed with 8 64-bit complex numbers, each consisting of a 32-bit real component and a 32-bit imaginary component. In alternate embodiments, the first and second source operands have different sizes, for example, 32-bits, 128-bits or 256-bits. In alternate embodiments, the first and second source operands are packed with different numbers of elements, for example, 4, 16 or 32 elements. In some embodiments, the VCFCMADD instruction includes source operand identifiers that identify memory locations, in which case the vector operands are first retrieved from memory. In some embodiments, when a source operand identifier identifies a memory location, a full vector is retrieved from memory and stored in a vector register for use by execution circuit 400. In other embodiments, when a source operand identifier identifies a memory location, a single element is retrieved from memory and broadcasted to the full vector length of a vector register for use by execution circuit 400. In some embodiments, a source operand identifier identifies a register whose contents are broadcasted to the full vector length of a vector register for use by execution circuit 400.

Execution circuit 400 is an example implementation of execution circuit 106 (FIG. 1). As shown, execution circuit 400 includes multipliers 410, 412, 414, and 416, that together with adders 418 and 420 and sign inverter 422, operate on the first element (first position of packed data, and including a real component and an imaginary component), identified by i0, of the first source operand 402 and the first element, also identified by I, of the second source operand 404, to produce the corresponding first element, also identified by i0, of destination operand 406. In particular, the first element of destination operand 406 consists of two numbers that are set according to a VCFCMADD computation using Equation 3 and Equation 4.

$$DST[I+0] \mathrel{+}= SRC1[I+0]*SRC2[I+0]+SRC1[I+1]*SRC2[I+1] \qquad \text{Equation 3:}$$

$$DST[I+1] \mathrel{+}= SRC1[I+1]*SRC2[I+0]-SRC1[I+0]*SRC2[I+1] \qquad \text{Equation 4:}$$

Equations 3 and 4, implementing the VCFCMADD instruction, are similar to Equations 1 and 2, implementing the VCFMADD instruction, but differ in the signs in the computations for DST[I+0] and DST[I+1].

Although FIG. 4 only shows execution circuitry for producing element i0 of destination operand 406, it should be understood that the multipliers, adder, and subtractor are replicated in some embodiments to calculate at least two elements of destination operand 406 in parallel. One embodiment replicates the multipliers, adder, and subtractor to the extent necessary to calculate every element of the destination operand in parallel. The number of destination operand elements calculated and produced in parallel can be varied, for example 2-at-a-time, or 4-at-a-time, or any number of elements at a time.

An embodiment of a serial implementation of VCFC-MADD, on the other hand, includes circuitry to calculate one element of the destination operand at a time. In serial embodiments, elements of destination operand 406 are calculated and set serially, calculating and setting one element of destination operand 406 at a time, which has the benefit of requiring less execution circuitry.

Some embodiments include parallel hardware circuitry to allow execution circuit 400 to calculate and set elements of destination operand 406 in one clock cycle. Other embodiments include parallel hardware circuitry to allow the execution circuit to calculate and set elements of destination operand 406 in a few clock cycles. Compared to using scalar operations to perform the functionality of the VCFMADD instruction, embodiments illustrated in FIG. 4 perform more quickly.

Figure 5A:
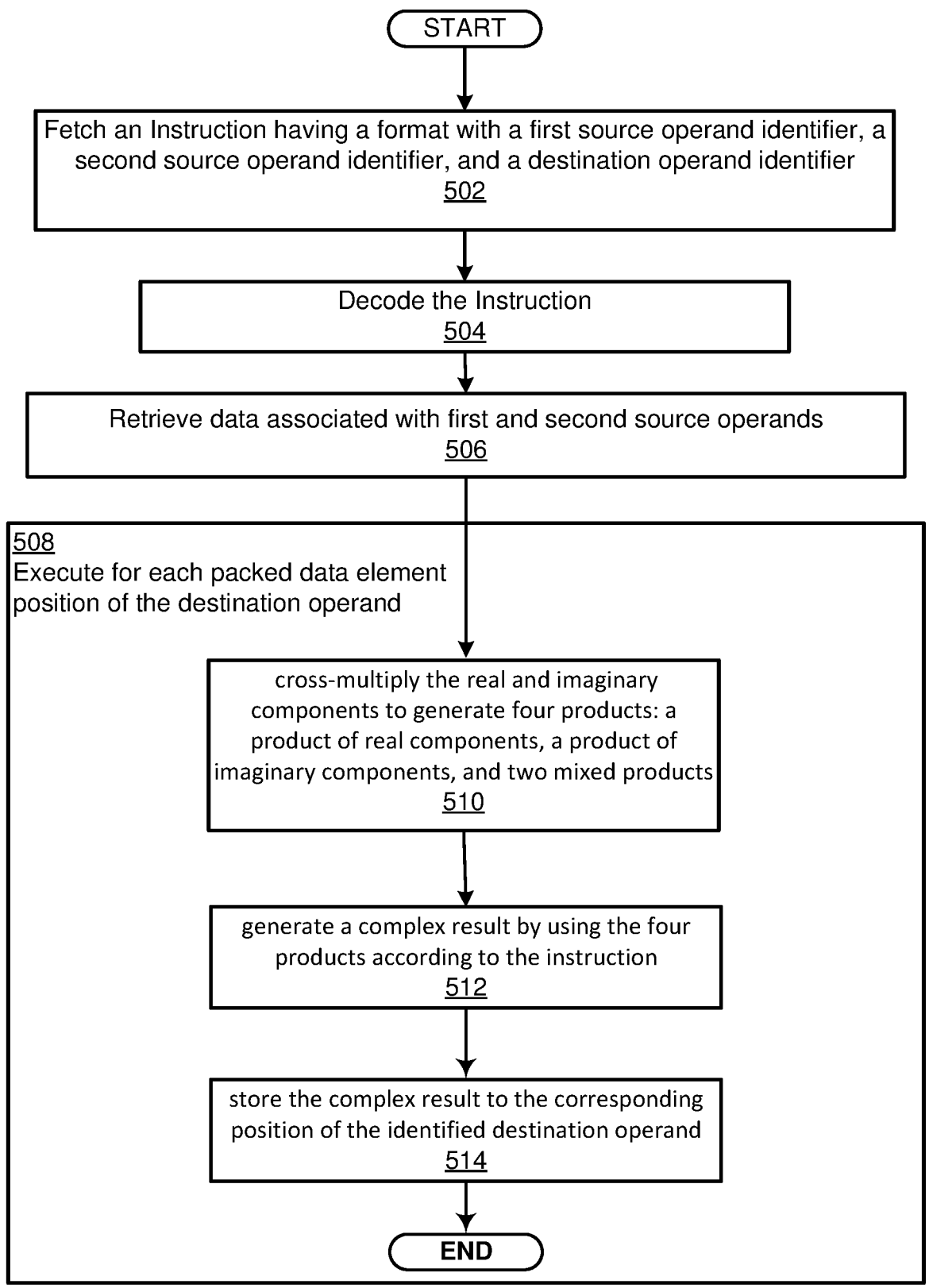
FIG. 5A is a block flow diagram illustrating execution of an instruction to multiply two packed complex numbers and accumulate the result according to one embodiment.

FIG. 5A illustrates an embodiment of a method of a processor (e.g., core, CPU, GPU, APU, etc.) to execute an instruction to multiply two complex source operands and accumulate the result. In some embodiments, the source operands are scalar values. An instruction is fetched at 502, decoded at 504, data associated with the first and second source operand identifiers are retrieved at 506, and the decoded instruction is executed at 508.

FIG. 5A illustrates execution 508 according to an embodiment. At 510, for each packed data element position of the identified first and second source operands, the real and imaginary components are cross-multiplied to generate four products: a product of real components, a product of imaginary components, and two mixed products. At 512, a complex result is generated by using the four products according to the instruction. At 514, the complex result is stored to the corresponding position of the identified destination operand.

As used herein, generating a product of imaginary components means multiplying the imaginary components of at least two complex numbers, such as those packed in the first and second source operas. As used herein, generating a product of real components means multiplying the real components of at least two complex numbers, such as those packed in the first and second source operas. As used herein, generating a mixed product means multiplying the imaginary components of one complex number with a real component of another complex number.

In some embodiments, the first and second source operands may be scalar values rather than vectors, in which case execution ends after 514. In some embodiments, the first and second source operands are packed data vectors that are to be executed in parallel, in which case at 508 executions will occur in parallel on at least two element positions of the packed vector. In some embodiments, the first and second source operands are packed data vectors that are to be executed serially, in which case execution 508 to 514 will occur in serial on at least two element positions of the packed vector.

In the case of a vector-complex fused multiply add (VCFMADD) instruction, execution 508 is to generate the real component of the complex result by subtracting the product of imaginary components from the product of real components (See Equation 1, above), generate the imaginary component of the complex result by adding the two mixed products (See Equation 2, above), and write the complex result to the corresponding packed data element position of the destination operand.

In the case of a vector-complex fused conjugated multiply add (VCFCMADD) instruction, execution 508 is to generate the real component of the complex result by adding the product of imaginary components and the product of real components (See Equation 3, above), generate the imaginary component of the complex result by subtracting one of the two mixed products from the other of the two mixed products (See Equation 4, above), and write the complex result to the corresponding packed data element position of the destination operand.

Figure 5B:
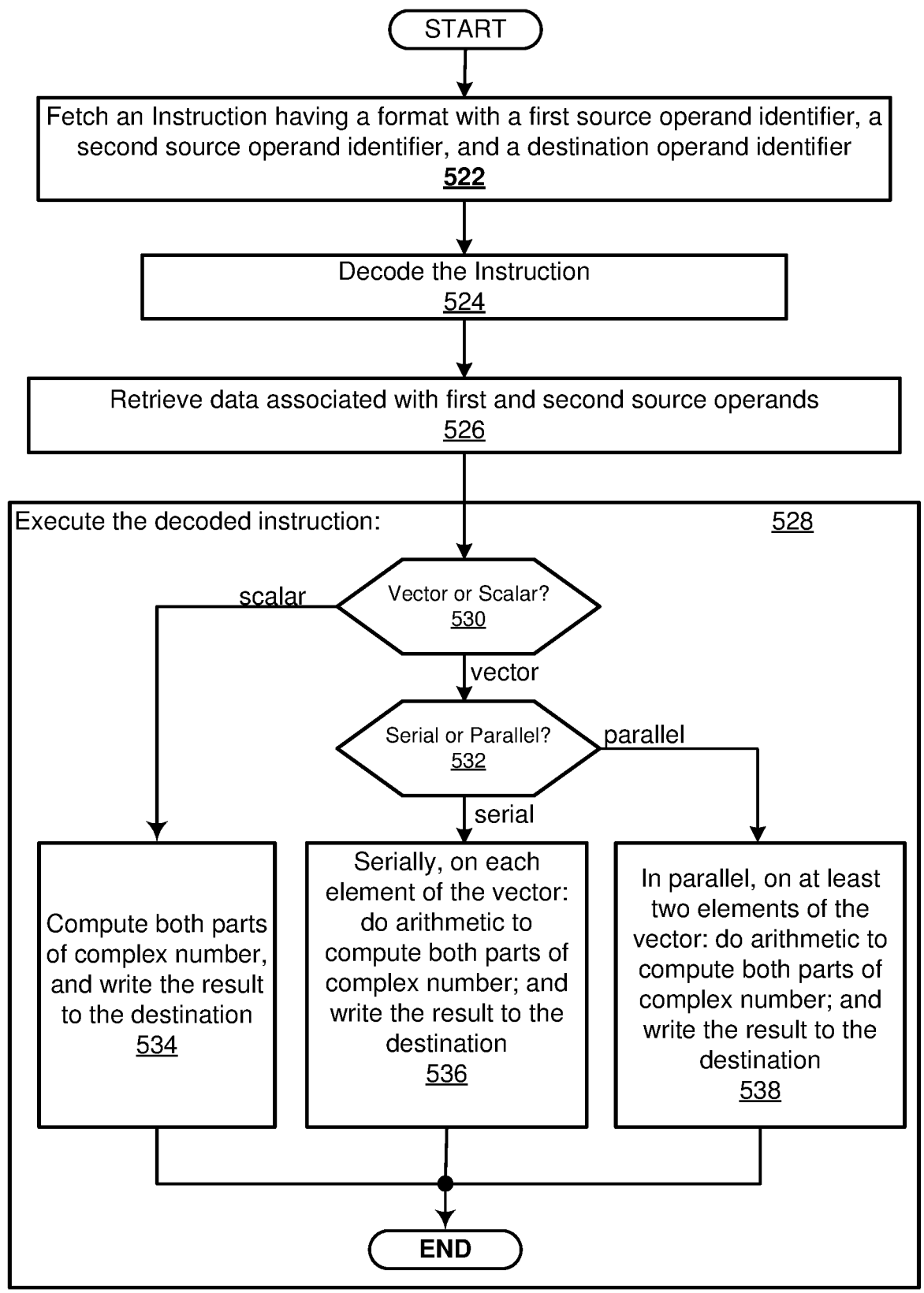
FIG. 5B is a block flow diagram illustrating execution of an instruction to multiply two packed complex numbers and accumulate the result according to one embodiment.

FIG. 5B illustrates an embodiment of a method of a processor (e.g., core, CPU, GPU, APU, etc.) to execute an instruction to multiply two complex source operands and accumulate the result. In some embodiments, the source operands are scalar values. In alternate embodiments, the source operands comprise packed data vectors and the method of FIG. 5B operates on each packed data element position, either serially or in parallel. FIG. 5B illustrates both vector and scalar implementation, and both parallel and serial implementations. An instruction is fetched at 522, decoded at 524, data associated with the first and second source operand identifiers of the instruction are retrieved at 526 and the instruction is executed at 528.

The instruction fetched at 522 has a format with a first source operand identifier, a second source operand identifier, and a destination operand identifier. Fetching an instruction at 522 is performed by fetching an instruction from instruction storage, for example instruction storage 102 (FIG. 1), which comprises a cache memory, an instruction register, a general register, or system memory. An embodiment of an instruction fetch unit included in a processor core is discussed below with respect to FIG. 12A and FIG. 12B.

Decoding the instruction at 524 includes decoding the various fields of the instruction, for example as illustrated in FIG. 2, including opcode 202, first source operand identifier 204, second source operand identifier 206, and destination operand identifier 208. Decoding the instruction at 524 also includes determining from where to retrieve the operands and to where to write the results.

Retrieving data associated with the first and second source operand identifiers at 526 comprises loading operands that are stored in registers of a register set or in memory. The register set is part of a register file, along with potentially other registers, such as status registers, flag registers, dedicated mask registers, vector registers, etc. One embodiment of a register file is described with reference to FIG. 11, below. In one embodiment, the registers are visible from the outside of the processor or from a programmer's perspective. For example, instructions specify operands stored in the registers. Various different types of registers are suitable, as long as they are capable of storing and providing data as described herein. Alternatively, one or more of the source and destination operands is stored in a storage location other than a register, such as, for example, a location in system memory.

Executing the instruction at 528 includes determining at 530 whether the first and second source operands are scalar values, or if they are vectors packed with complex number data elements. When the first and second source operands are scalar, rather than vector data, wherein the identified first and second source operands are scalar values and each comprise a single complex number. If the source operands are scalar values, at 534 both parts of a complex number result are produced, for example according to Equation 1 and Equation 2 for a VCFMADD instruction, or Equation 3 and Equation 4 for a VCFCMADD instruction. The results are then written to the corresponding element identified by the destination operand identifier, before ending.

If it is determined at 530, on the other hand, that the first and second source operands identify vectors packed with data elements, at 532 it is determined whether to execute the instruction serially or in parallel. In one embodiment, an extra character is included in the opcode 202 that designates whether the execution should be serial or parallel. In another embodiment, a register in the register set is configured to store a control value that controls whether the VCFMADD and VCFCMADD should operate on vector elements serially or in parallel.

If it is determined at 532 that the execution circuitry is to calculate and set elements of destination operand serially, at 536, on each element of the vector, serially: both parts of a complex number are calculated, for example according to Equation 1 and Equation 2 for a VCFMADD instruction, or Equation 3 and Equation 4 for a VCFCMADD instruction. The result is written back to the location identified by the destination operand identifier at 536.

If it is determined at 532 that the execution circuitry is to calculate and set elements of destination operand in parallel, at 538 at least two elements of a vector are computed, for example according to Equation 1 and Equation 2 for a VCFMADD instruction, or Equation 3 and Equation 4 for a VCFCMADD instruction. In some embodiments every element of the destination operand is executed in parallel. The results are then written to the destination. In some embodiments, all elements of the destination operand are computed and written in parallel.

Execution 528 is further described below with reference to pseudocode illustrated in FIG. 6, FIG. 7, and FIG. 8.

In some embodiments, execution circuitry performs execution 528 in a single clock cycle. In other embodiments, execution circuitry performs execution 528 in a few clock cycles. In both cases, execution of VCFMADD and VCFCMADD instructions according to embodiments disclosed herein is faster than performing those functions using a sequence of scalar instructions.

Figure 5C:
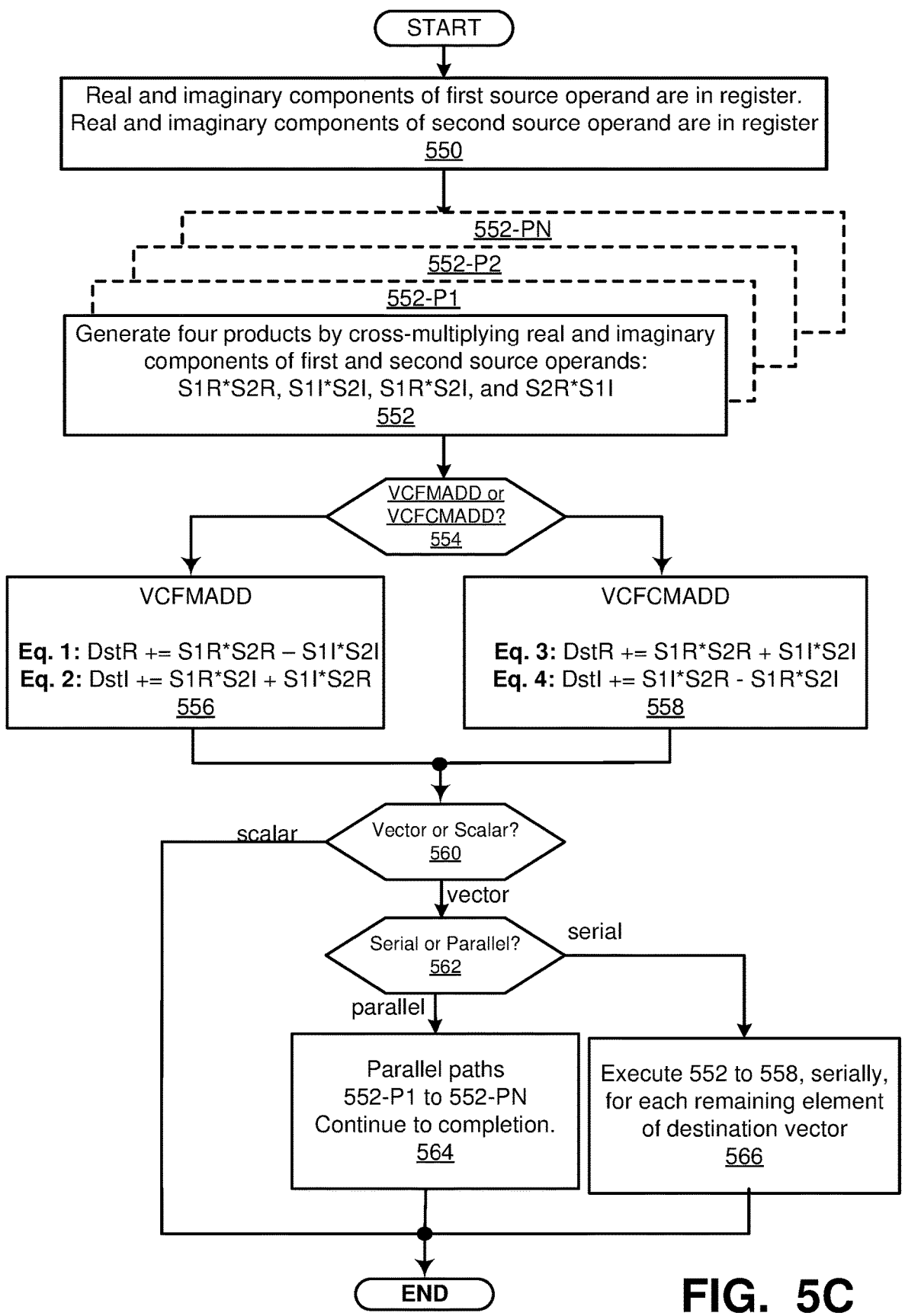
FIG. 5C is a block flow diagram illustrating execution of an instruction to multiply two packed complex numbers and accumulate the result according to one embodiment.

FIG. 5C illustrates an embodiment of a method of a processor (e.g., core, CPU, GPU, APU, etc.) to execute an instruction to multiply two complex source operands and accumulate the result. The method illustrated in FIG. 5C performs similar functions as execution circuit 508 (FIG. 5A). At 550, real and imaginary components of the first source operand and the second source operand are in registers. The embodiment illustrated in FIG. 5C is an example of a method executed by a processor starting at a point after the first and second source operands have been retrieved from a register or from memory and stored in a register, for example after completion of 506 (FIG. 5A).

At 552, four products are generated by cross-multiplying real and imaginary components of the first and second source operands, yielding S1R*S2R, S1I*S2I, S1R*S2I, and S2R*S1I. In a packed data embodiment, the multiplications at 552 are conducted on one of the complex number elements of the first and second source operands. In a packed data embodiment that is to utilize parallel processing, at 552-P1, 552-P2, . . . , and 552-PN, N additional complex number elements of the first and second source operands are processed in parallel, generating four products and performing the remainder of the method on those additional elements. For simplicity, the remainder of the method beyond 551-P1 to 551-PN is not shown for those additional elements. In some embodiments, N is one. In other embodiments, N is large enough such that all remaining elements of the first and second source operands are processed in parallel.

At 554, it is determined whether the instruction is VCFMADD or VCFCMADD.

FIG. 6 is pseudocode to illustrate operation of an execution circuit to implement a VCFMADD instruction according to one embodiment. As shown, pseudocode 600 illustrates that execution circuit 106 (FIG. 1) is set up with a VLEN (vector length) variable, used to set a number of elements over which to loop. If it is a VCFMADD, at 556 the four products are accumulated into the real and imaginary components of the complex number at the corresponding element of the destination operand:

$DstR+=S1R*S2R-S1I*S2I$ $DstI+=S1R*S2I+S1I*S2R$

If, on the other hand, the instruction is a VCFCMADD, at 558 the four products are accumulated into the real and imaginary components of the complex number at the corresponding element of the destination operand:

$DstR+=S1R*S2R+S1I*S2I$ $DstI+=S1I*S2R-S1I*S2R$

At 560, it is determined whether the instruction is a vector or scalar instruction. If scalar, the method ends. If the instruction is a vector instruction operating on packed data elements, at 562 it is determined whether execution is to be conducted on the remaining elements of the first and second source operands in parallel or serially. If the execution is to proceed in parallel, at 564, the parallel computations that followed 552-P1, 552-P2,552-PN are allowed to complete, then the method ends. If the execution is to proceed serially, at 566 the method executes 552 to 558 serially for each remaining element of the destination vector. Then, the method ends.

The opcode 202 of the VCFMADD instruction is used to set up the function. As to VLEN, in some embodiments, the opcode 202 (FIG. 2) includes a number used to set VLEN, for example 8, 16, 32, or 64. In some embodiments, the opcode 202 (FIG. 2) includes a number or letters indicating the size of the data elements, for example Q, D, or W.

As shown in FIG. 6, the VCFMADD function receives as inputs 512-bit first source operand SRC1 and second source operand SRC2, and is to store a result in destination operand DST. The locations from which the first source operand and the second source operand are retrieved, and where the destination is written can be in registers or in memory, for example registers 108 and memory 110—(FIG. 1), as specified by first source operand identifier 204, second source operand identifier 206, and destination operand identifier 208 (FIG. 2). The execution circuit 106 (FIG. 1), as illustrated by the pseudocode of FIG. 6, loops over the 16 32-bit elements of SRC1 and SRC2 to calculate and store 16 32-bit elements of DST. On each loop iteration, the opcode determines whether DST is to be calculated using Equation 1 and Equation 2, if VCFMADD, or Equation 3 and Equation 4 if VCFCMADD.

The execution circuit 106 (FIG. 1) can process the elements one at a time, serially, or can process multiple elements, or all elements, at the same time in parallel.

FIG. 7 is pseudocode to illustrate operation of an execution circuit to implement a VCFMADD instruction according to one embodiment. As shown, pseudocode 700 illustrates that execution circuit 106 (FIG. 1) is set up with a VLEN variable, used to set a number of elements over which to loop, and a MaskBit variable indicating which elements of the destination operand should be set.

The opcode 202 of the VCFMADD instruction is used to set up the function. As to VLEN, in some embodiments, the opcode 202 (FIG. 2) of the VCFMADD instruction includes a number used to set VLEN, for example 8, 16, or 32. In some embodiments, the opcode 202 (FIG. 2) of the VCFMADD instruction includes a number or letters indicating the size of the data elements, for example "Q" is used to specify an 8-byte quadword, "D" is used to specify a 4-byte Doubleword, "W" is used to specify a 2-byte word, and "B" is used to specify an 8-bit byte. As to MaskBit, in some embodiments, a general purpose register or a mask register of a register file can be programmed with a value to be used for MaskBit when the VCFMADD instruction is called. In some embodiments the opcode 202 of the VCFMADD is a full opcode field 974, including a data element width field 964 and a write mask field 970, as discussed with respect to FIG. 9A, below.

As shown in FIG. 7, the VCFMADD function receives as inputs 512-bit first source operand SRC1 and second source operand SRC2, and is to store a result in destination operand DST. The locations from which the first source operand and the second source operand are retrieved, and where the destination is written can be in registers or in memory, for example registers 108 and memory 110—(FIG. 1), as specified by first source operand identifier 204, second source operand identifier 206, and destination operand identifier 208 (FIG. 2). The execution circuit 106 (FIG. 1), as illustrated by the pseudocode of FIG. 7, loops over the 16 32-bit elements of SRC1 and SRC2 to calculate and store 16 32-bit elements of DST. On each loop iteration, the values of the two components of DST are calculated using Equation 1 and Equation 2, above. On the other hand, if there is a write mask, for each data element having a corresponding MaskBit equal to zero (0), the flow determines whether "merging-masking" is true, and, if so, DST remains unchanged, and, if not, the DST element is reset to zero (0).

The execution circuit 106 (FIG. 1) can process the elements one at a time, serially, or can process multiple elements, or all elements, at the same time in parallel.

FIG. 8 is pseudocode to illustrate operation of an execution circuit to implement a VCFCMADD instruction according to one embodiment. As shown, pseudocode 800 illustrates that execution circuit 106 (FIG. 1) is set up with a VLEN variable, used to set a number of elements over which to loop, and a MaskBit variable indicating which elements of the destination operand should be set.

The opcode 202 of the VCFCMADD instruction is used to set up the function. As to VLEN, in some embodiments, the opcode 202 (FIG. 2) of the VCFCMADD instruction includes a number used to set VLEN, for example 8, 16, or 32. In some embodiments, the opcode 202 (FIG. 2) of the VCFCMADD instruction includes a number or letters indicating the size of the data elements, for example Q, D, or W. As to MaskBit, in some embodiments, a general purpose register or a mask register of a register file can be programmed with a value to be used for MaskBit when the VCFCMADD instruction is called. In some embodiments the opcode 202 of the VCFCMADD is a full opcode field 974, including a data element width field 964 and a write mask field 970, as discussed with respect to FIG. 9A, below.

As shown in FIG. 8, the VCFCMADD function receives as inputs 512-bit first source operand SRC1 and second source operand SRC2, and is to store a result in destination operand, DST. The locations from which the first source operand and the second source operand are retrieved, and where the destination is written can be in registers or in memory, for example registers 108 and memory 11—(FIG. 1), as specified by first source operand identifier 204, second source operand identifier 206, and destination operand identifier 208 (FIG. 2). The execution circuit 106 (FIG. 1), as illustrated by the pseudocode of FIG. 8, loops over the 16

32-bit elements of SRC1 and SRC2 to calculate and store 16 32-bit elements of DST. On each loop iteration, the values of the two components of DST are calculated using Equation 3 and Equation 4, above. On the other hand, if there is a write mask, for each data element having a corresponding MaskBit equal to zero (0), the flow determines whether "merging-masking" is true, and, if so, DST remains unchanged, and, if not, the DST is reset to zero (0).

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2), and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014, and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments support only vector operations with the vector friendly instruction format.

Figure 9A:
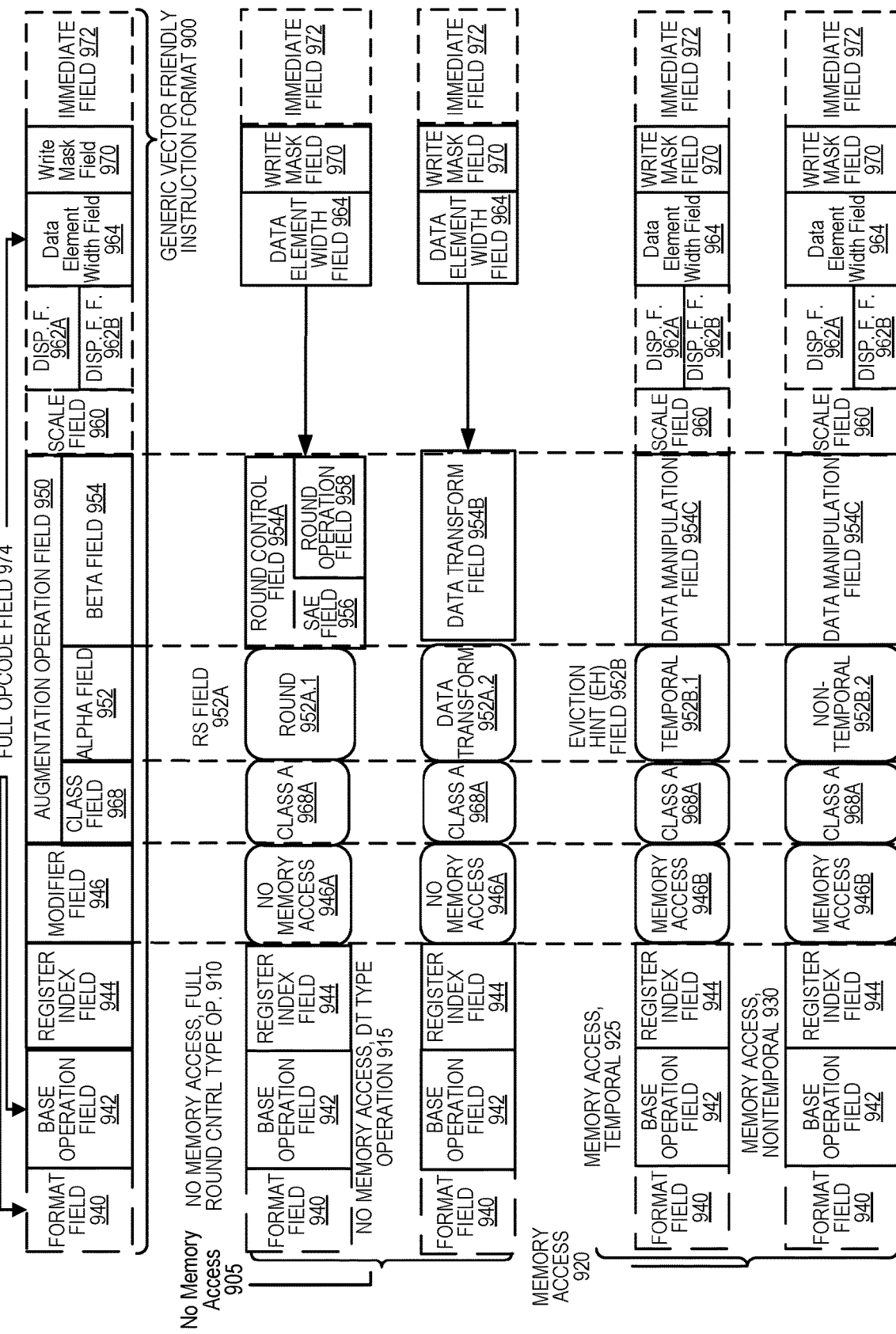
FIGS. 9A-9B are block diagrams illustrating a generic vector friendly instruction format and instruction templates thereof according to embodiments of the invention.
Figure 9B:
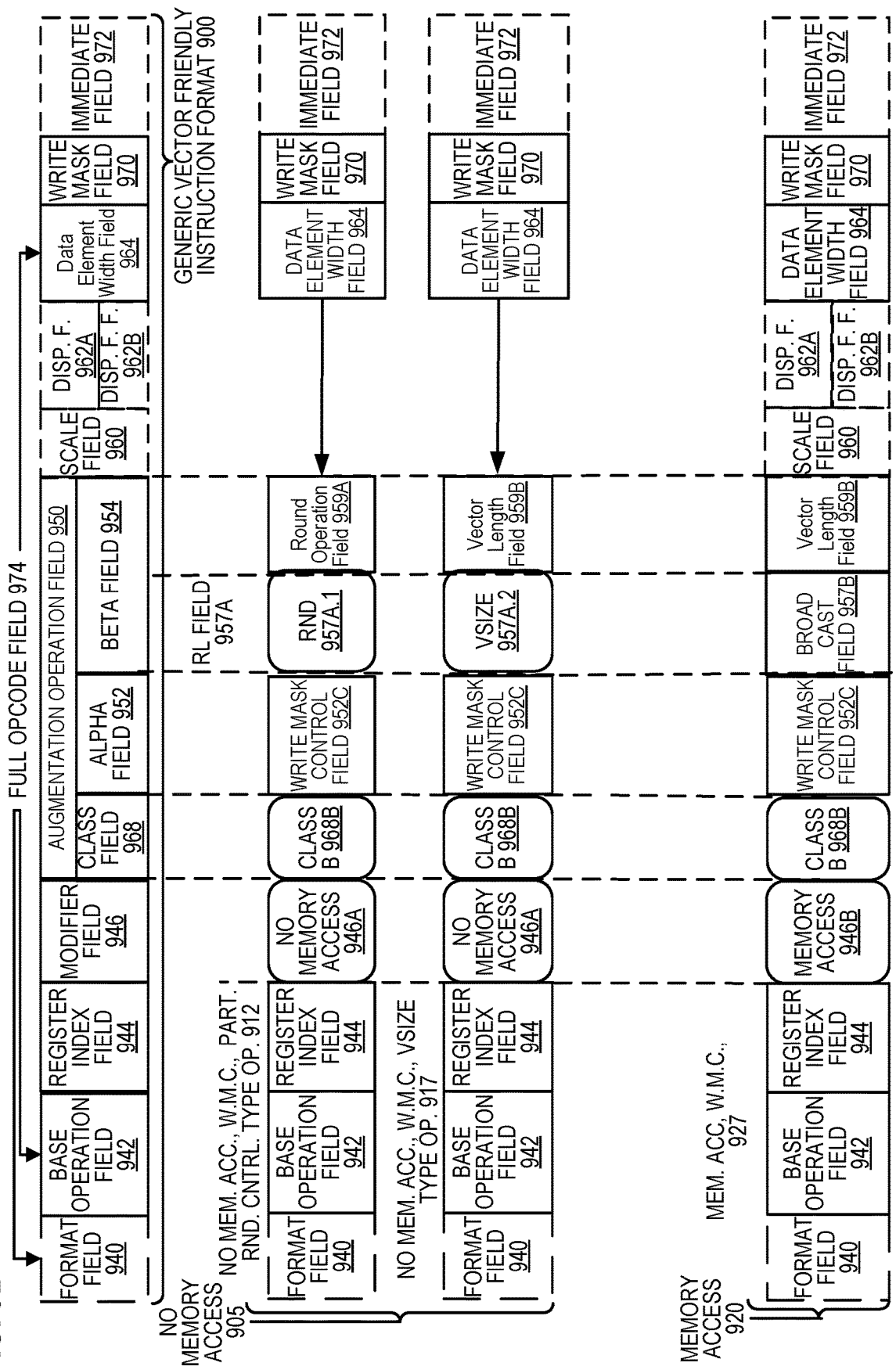

FIGS. 9A-9B are block diagrams illustrating a generic vector friendly instruction format and instruction templates thereof according to embodiments of the invention. FIG. 9A is a block diagram illustrating a generic vector friendly instruction format and class A instruction templates thereof according to embodiments of the invention, while FIG. 9B is a block diagram illustrating the generic vector friendly instruction format and class B instruction templates thereof according to embodiments of the invention. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements), a 64 byte vector operand length (or size) with 16 bit (2 byte) or 8 bit (1 byte) data element widths (or sizes), a 32 byte vector operand length (or size) with 32 bit (4 byte), 64 bit (8 byte), 16 bit (2 byte), or 8 bit (1 byte) data element widths (or sizes), and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template, and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template, and 2) within the memory access 920 instruction templates there is shown a memory access, write mask control 927 instruction template.

The generic vector friendly instruction format 900 includes the following fields listed below in the order illustrated in FIGS. 9A-9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access (e.g., as shown as modifier field 946B) from those that do not (e.g., as shown as modifier field 946A), that is, between no memory access 905 instruction templates and memory access 920 instruction templates.

Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 950—its content distinguishes which one of a variety of different operations to be performed in addition to the base operation. This field is context specific. In one embodiment of the invention, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}*index+base$).

Displacement Field 962A—its content is used as part of memory address generation (e.g., for address generation that uses $2^{scale}*index+base+displacement$).

Displacement Factor Field 962B (note that the juxtaposition of displacement field 962A directly over displacement factor field 962B indicates one or the other is used)—its content is used as part of address generation, it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments for all instructions, in other embodiments for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation), in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment, an element of the destination is set to 0 when the corresponding mask bit has a 0 value. A subset of this functionality is the ability to control the vector length of the operation being performed (that is, the span of elements being modified, from the first to the last one), however, it is not necessary that the elements that are modified be consecutive. Thus, the write mask field 970 allows for partial vector operations, including loads, stores, arithmetic, logical, etc. While embodiments of the invention are described in which the write mask field's 970 content selects one of a number of write mask registers that contains the write mask to be used (and thus the write mask field's 970 content indirectly identifies that masking to be performed), alternative embodiments instead or additional allow the mask write field's 970 content to directly specify the masking to be performed.

Immediate field 972—its content allows for the specification of an immediate. This field is optional in the sense that is it not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement factor field 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described embodiments of the invention the round control field 954A includes a suppress all floating point exceptions (SAE) field 956 and a round operation control field 958, alternative embodiments may support may encode both these concepts into the same field or only have one or the other of these concepts/fields (e.g., may have only the round operation control field 958).

SAE field 956—its content distinguishes whether or not to disable the exception event reporting, when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In one embodiment of the invention where a processor includes a control register for specifying rounding modes, the round operation control field's 958 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation, broadcast, up conversion of a source, and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement factor field 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In one embodiment of the invention where a processor includes a control register for specifying rounding modes, the round operation control field's 959A content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution, or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 10A is a block diagram illustrating an exemplary specific vector friendly instruction format according to embodiments of the invention. FIG. 10A shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field 1015, real opcode byte field 1030 MOD R/M field 1040, SIB field 1050 (which includes SS field 1052, 3-bit XXX field 1054, and 3-bit BBB field 1056, displacement field 962A and immediate fields of the existing x86 instruction set with extensions. The fields from FIG. 9 into which the fields from FIG. 10A map are illustrated.

It should be understood that, although embodiments of the invention are described with reference to the specific vector friendly instruction format 1000 in the context of the generic vector friendly instruction format 900 for illustrative purposes, the invention is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the invention is not so limited (that is, the generic vector friendly instruction format 900 contemplates other sizes of the data element width field 964).

The generic vector friendly instruction format 900 includes the following fields listed below in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in one embodiment of the invention).

The second-fourth bytes (EVEX Bytes 1-3) include a number of bit fields providing specific capability.

REX field 1005 (EVEX Byte 1, bits [7-5])—consists of a EVEX.R bit field (EVEX Byte 1, bit [7]—R), EVEX.X bit field (EVEX byte 1, bit [6]—X), and EVEX.B bit field (EVEX byte 1, bit [5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field, alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]—mmmm)—its content encodes an implied leading opcode byte (0F, 0F 38, or 0F 3).

Data element width field 964 (EVEX byte 2, bit [7]—W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands, 2) EVEX.vvvv encodes the destination register operand, specified in 1s complement form for certain vector shifts, or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]—U)—If EVEX.U=0, it indicates class A or EVEX.U0, if EVEX.U=1, it indicates class B or EVEX.U1.

Prefix encoding field 1025 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]—EH, also known as EVEX.EH, EVEX.rs, EVEX.RL, EVEX.write mask control, and EVEX.N, also illustrated with α)—as previously described, this field is context specific.

Beta field 954 (EVEX byte 3, bits [6:4]—SSS, also known as EVEX.s$_{2-0}$, EVEX.r$_{2-0}$, EVEX.rr1, EVEX.LL0, EVEX.LLB, also illustrated with βββ)—as previously described, this field is context specific.

REX' field 910—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—As previously described, the scale field's 960 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 offsets, in terms of 64 byte cache lines, disp8 uses 8 bits that can be set to only four really useful values −128, −64, 0, and 64, since a greater range is often needed, disp32 is used, however, disp32 requires 4 bytes. In contrast to disp8 and disp32, the displacement factor field 962B is a reinterpretation of disp8, when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

FIG. 10B is a block diagram illustrating the fields of the specific vector friendly instruction format 1000 that make up the full opcode field 974 according to one embodiment of the invention. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to one embodiment of the invention. Specifically, the register index field 944 includes the REX field 1005, the REX' field 1010, the MODR/M.reg field 1044, the MODR/M. r/m field 1046, the VVVV field 1020, xxx field 1054, and the bbb field 1056.

Augmentation Operation Field

FIG. 10D is a block diagram illustrating the fields of the specific vector friendly instruction format 1000 that make up the augmentation operation field 950 according to one embodiment of the invention. When the class (U) field 968 contains 0, it signifies EVEX.U0 (class A 968A), when it contains 1, it signifies EVEX.U1 (class B 968B). When U=0 and the MOD field 1042 contains 11 (signifying no memory access operation, so SIB byte 1050 is not shown), the alpha field 952 (EVEX byte 3, bit [7]—EH) is interpreted as the rs field 952A. When the rs field 952A contains a 1 (round 952A.1), the beta field 954 (EVEX byte 3, bits [6:4]—SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]—SSS) is interpreted as a three bit data transform field 954B. When U=0 and the MOD field 1042 contains 00, 01, or 10 (signifying a memory access operation so SIB byte 1050 is shown), the alpha field 952 (EVEX byte 3, bit [7]—EH) is interpreted as the eviction hint (EH) field 952B and the beta field 954 (EVEX byte 3, bits [6:4]—SSS) is interpreted as a three bit data manipulation field 954C.

When U=1, the alpha field 952 (EVEX byte 3, bit [7]—EH) is interpreted as the write mask control (Z) field 952C. When U=1 and the MOD field 1042 contains 11 (signifying a no memory access operation), part of the beta field 954 (EVEX byte 3, bit [4]—$S_0$) is interpreted as the RL field 957A, when it contains a 1 (round 957A.1) the rest of the beta field 954 (EVEX byte 3, bit [6-5]—$S_{2-1}$) is interpreted as the round operation field 959A, while when the RL field 957A contains a 0 (VSIZE 957.A2) the rest of the beta field 954 (EVEX byte 3, bit [6-5]—$S_{2-1}$) is interpreted as the vector length field 959B (EVEX byte 3, bit [6-5]—$L_{1-0}$). When U=1 and the MOD field 1042 contains 00, 01, or 10 (signifying a memory access operation), the beta field 954 (EVEX byte 3, bits [6:4]—SSS) is interpreted as the vector length field 959B (EVEX byte 3, bit [6-5]—$L_{1-0}$) and the broadcast field 957B (EVEX byte 3, bit [4]—B).

Exemplary Register Architecture

Figure 11:
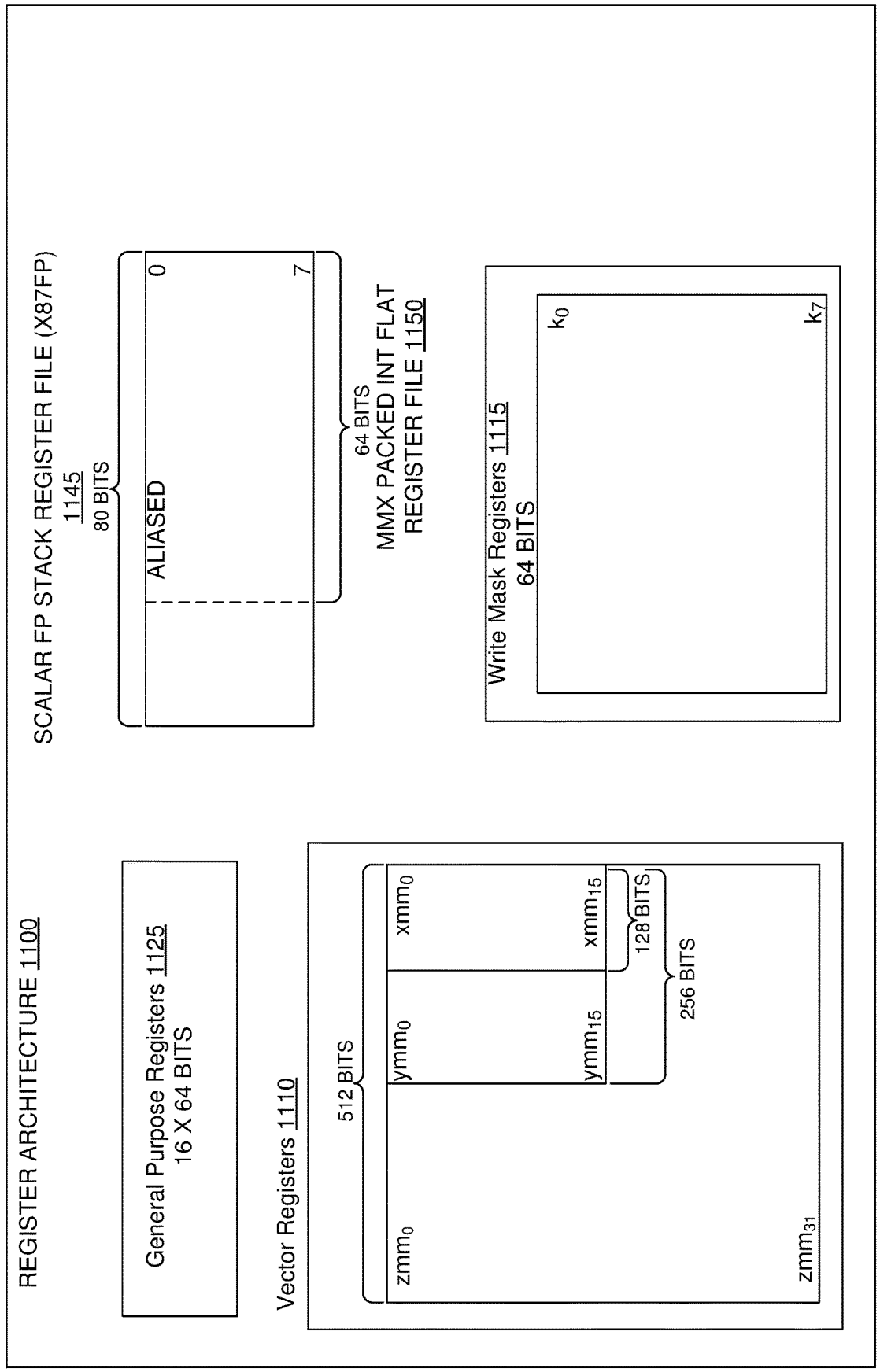
FIG. 11 is a block diagram of a register architecture according to one embodiment of the invention.

FIG. 11 is a block diagram of a register architecture 1100 according to one embodiment of the invention. In the embodiment illustrated, there are 32 vector registers 1110 that are 512 bits wide, these registers are referenced as zmm0 through zmm31. The lower order 256 bits of the lower 16 zmm registers are overlaid on registers ymm0-16.

The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

| Adjustable Vector Length | Class | Operations | Registers |
|---|---|---|---|
| Instruction Templates that do not include the vector length field 959B | A (FIG. 9A, U = 0) | 910, 915, 925, 930 | zmm registers (the vector length is 64 byte) |
| | B (FIG. 9B, U = 1) | 912 | zmm registers (the vector length is 64 byte) |
| Instruction templates that do include the vector length field 959B | B (FIG. 9B, U = 1) | 917, 927 | zmm, ymm, or xmm registers (the vector length is 64-byte, 32-byte, or 16-byte) depending on the vector length field 959B |

In other words, the vector length field 959B selects between a maximum length and one or more other shorter lengths, where each such shorter length is half the length of the preceding length, and instructions templates without the vector length field 959B operate on the maximum vector length. Further, in one embodiment, the class B instruction templates of the specific vector friendly instruction format 1000 operate on packed or scalar single/double-precision floating point data and packed or scalar integer data. Scalar operations are operations performed on the lowest order data element position in an zmm/ymm/xmm register, the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the invention, the vector mask register k0 cannot be used as a write mask, when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension, while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing, 2) a high performance general purpose out-of-order core intended for general-purpose computing, 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing, and 2) a coprocessor including one or more special purpose cores intended primarily for graphics and/or scientific (throughput) computing. Such different processors lead to different computer system architectures, which may include: 1) the coprocessor on a separate chip from the CPU, 2) the coprocessor on a separate die in the same package as a CPU, 3) the coprocessor on the same die as a CPU (in which case, such a coprocessor is sometimes referred to as special purpose logic, such as integrated graphics and/or scientific (throughput) logic, or as special purpose cores), and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decodes stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file unit(s) 1258. Each of the physical register file unit(s) 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 1258 comprises a vector registers unit, a write mask registers unit, and a scalar registers unit. These register units may provide architectural vector registers, vector mask registers, and general purpose registers. The physical register file unit(s) 1258 is overlapped by the retirement unit 1254 to illustrate various ways in which register renaming and out-of-order execution may be implemented (e.g., using a reorder buffer(s) and a retirement register file(s), using a future file(s), a history buffer(s), and a retirement register file(s), using a register map and a pool of registers, etc.). The retirement unit 1254 and the physical register file unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit(s), and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204, 2) the decode unit 1240 performs the decode stage 1206, 3) the rename/allocator unit 1252 performs the allocation stage 1208 and renaming stage 1210, 4) the scheduler unit(s) 1256 performs the schedule stage 1212, 5) the physical register file unit(s) 1258 and the memory unit 1270 perform the register read/memory read stage 1214, the execution cluster 1260 perform the execute stage 1216, 6) the memory unit 1270 and the physical register file unit(s) 1258 perform the write back/memory write stage 1218, 7) various units may be involved in the exception handling stage 1222, and 8) the retirement unit 1254 and the physical register file unit(s) 1258 perform the commit stage 1224.

The core 1290 may support one or more instructions sets (e.g., the x86 instruction set (with some extensions that have been added with newer versions), the MIPS instruction set of MIPS Technologies of Sunnyvale, Calif., the ARM instruction set (with optional additional extensions such as NEON) of ARM Holdings of Sunnyvale, Calif.), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 13B:
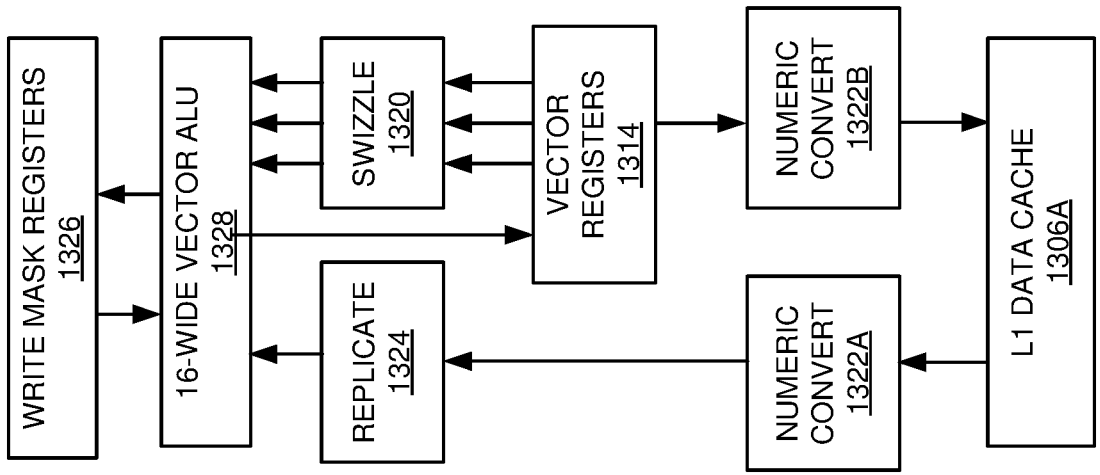
FIGS. 13A-B illustrate a block diagram of a more specific exemplary in-order core architecture, which core would be one of several logic blocks (including other cores of the same type and/or different types) in a chip.
Figure 13A:
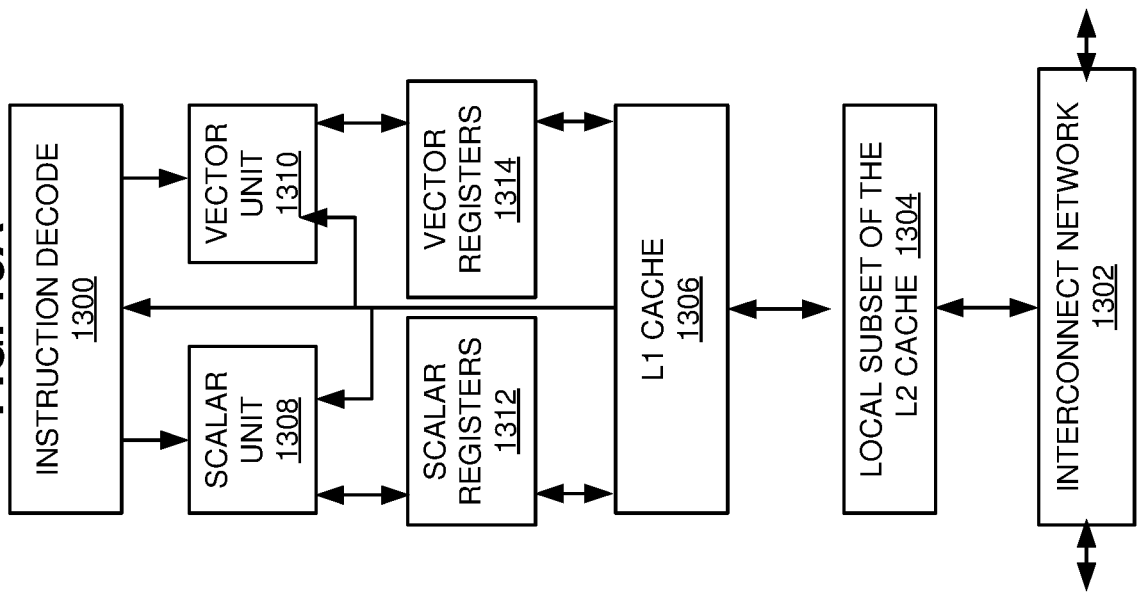

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the invention. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the invention may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the invention. FIG. 13B includes an L1 data cache part 1306A of the L1 cache 1306, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
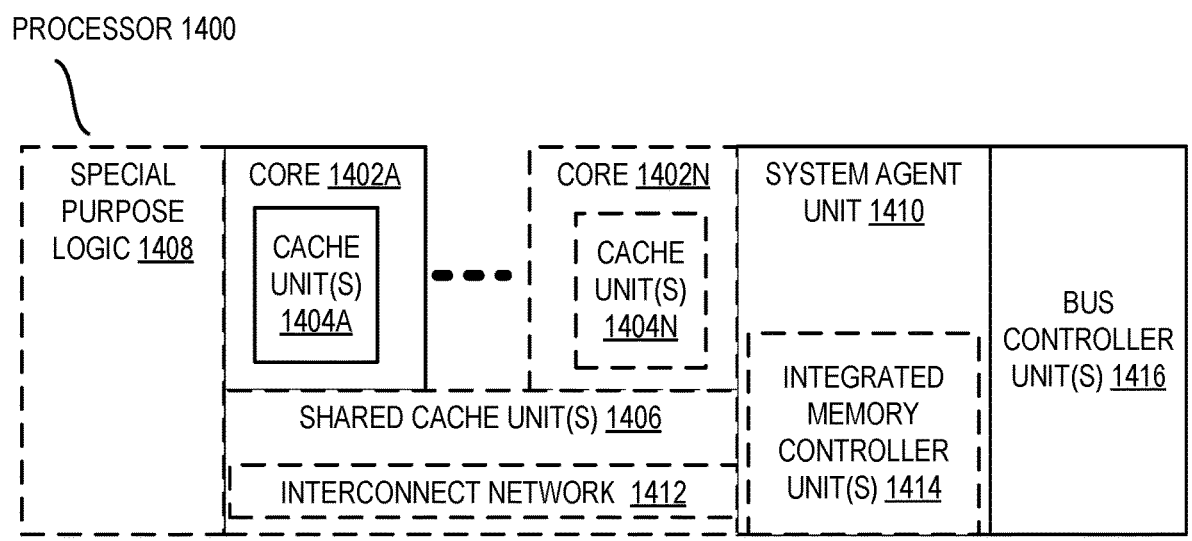
FIG. 14 is a block diagram of a processor 1400 that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two), 2) a coprocessor with the cores 1402A-N being a large number of special purpose cores intended primarily for graphics and/or scientific (throughput), and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408 (integrated graphics logic 1408 is an example of and is also referred to herein as special purpose logic), the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multithreading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set, that is, two or more of the cores 1402A-N may be capable of executing the same instruction set, while others may be capable of executing only a subset of that instruction set or a different instruction set.

Exemplary Computer Architectures

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
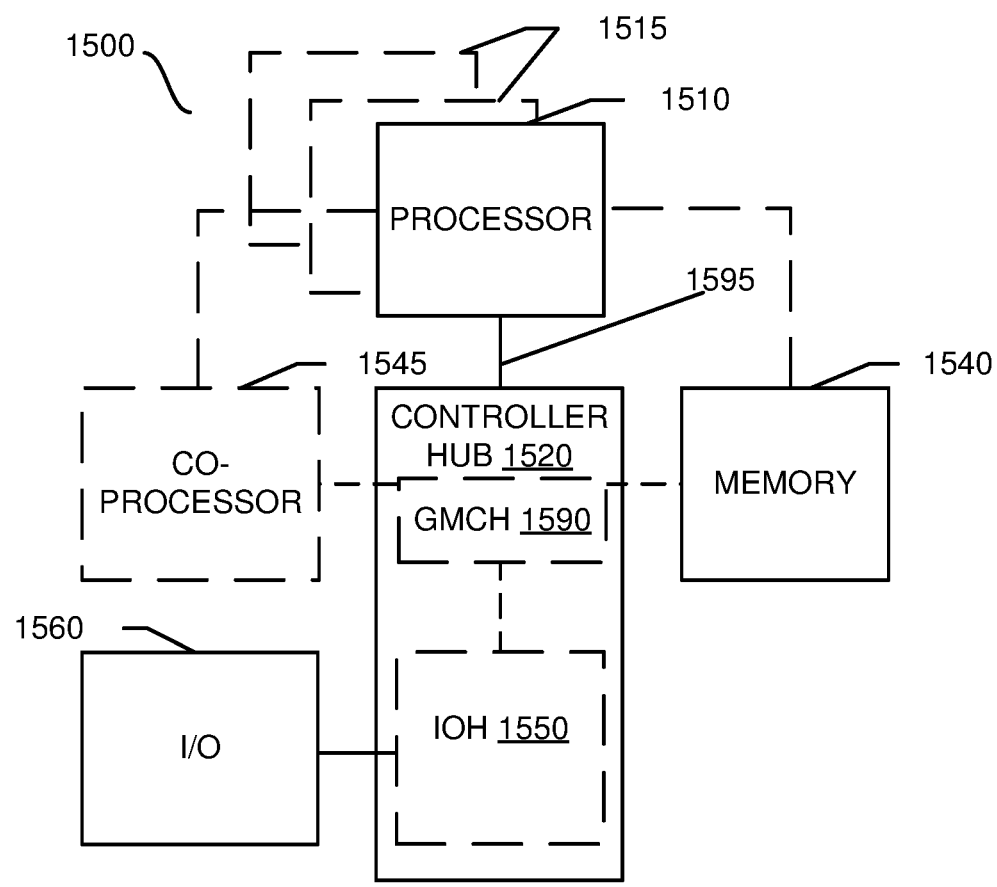
FIGS. 15-18 are block diagrams of exemplary computer architectures, FIG. 15 shown a block diagram of a system in accordance with one embodiment of the present invention.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips), the GMCH 1590 includes memory and graphics controllers to which are coupled memory 1540 and a coprocessor 1545, the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
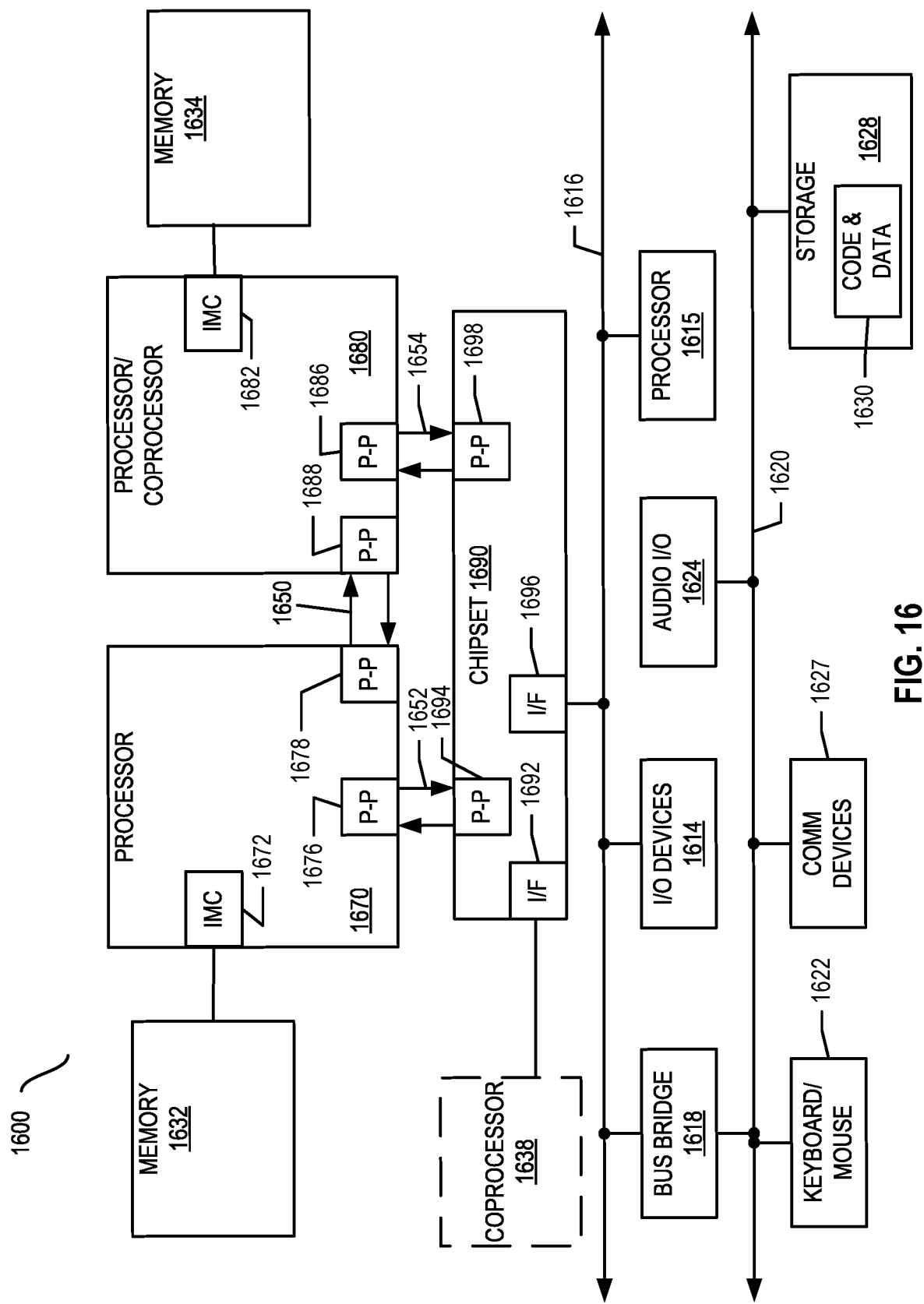

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 and coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678, similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
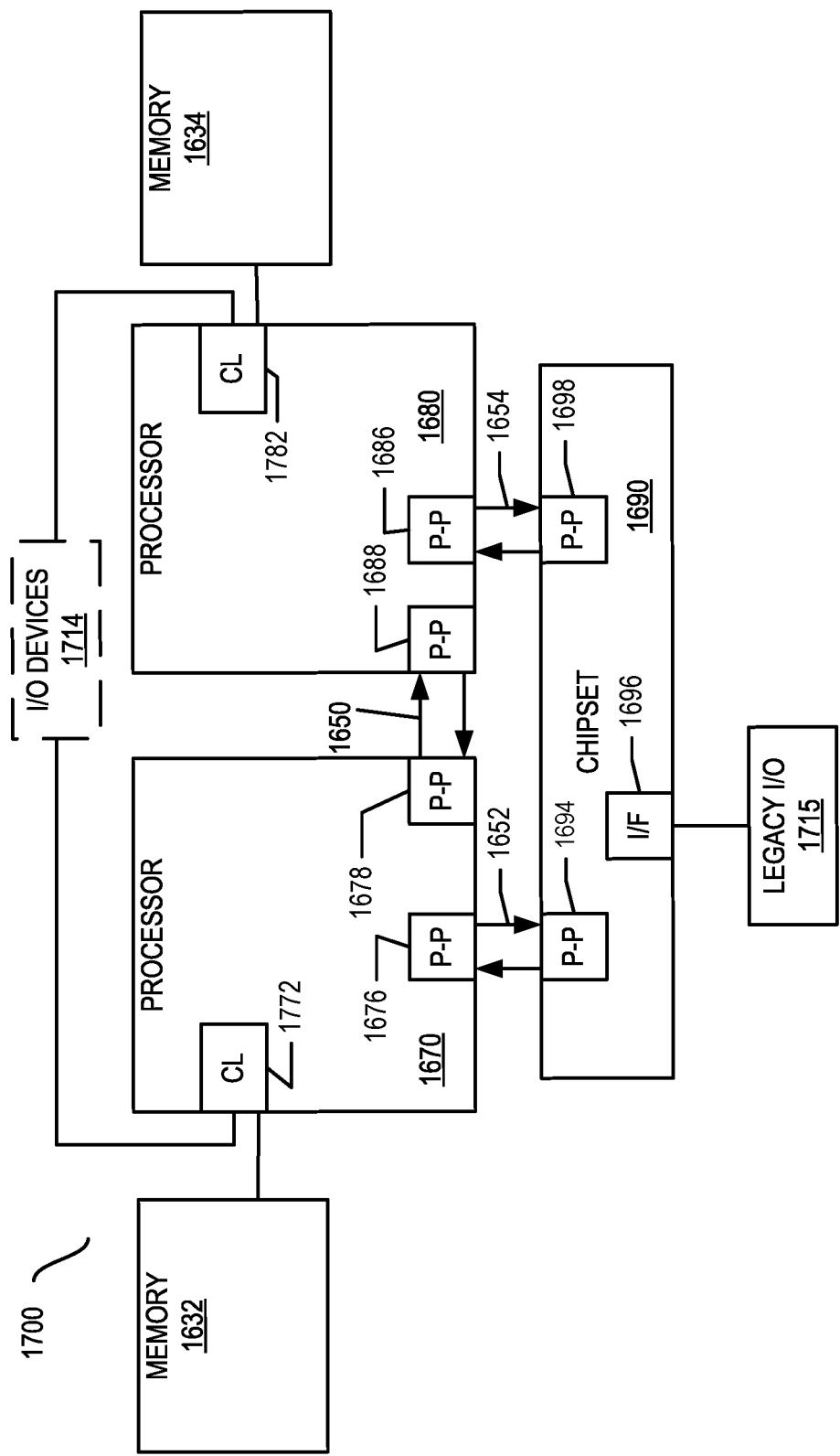

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1772 and 1782 respectively. Thus, the CL 1772, 1782 include integrated memory controller units and include I/O control logic. FIG. 17 illustrates that not only are the memories, 1634 coupled to the CL 1772, 1782, but also that I/O devices 1714 are also coupled to the control logic 1772, 1782. Legacy I/O devices 1715 are coupled to the chipset 1690.

Figure 18:
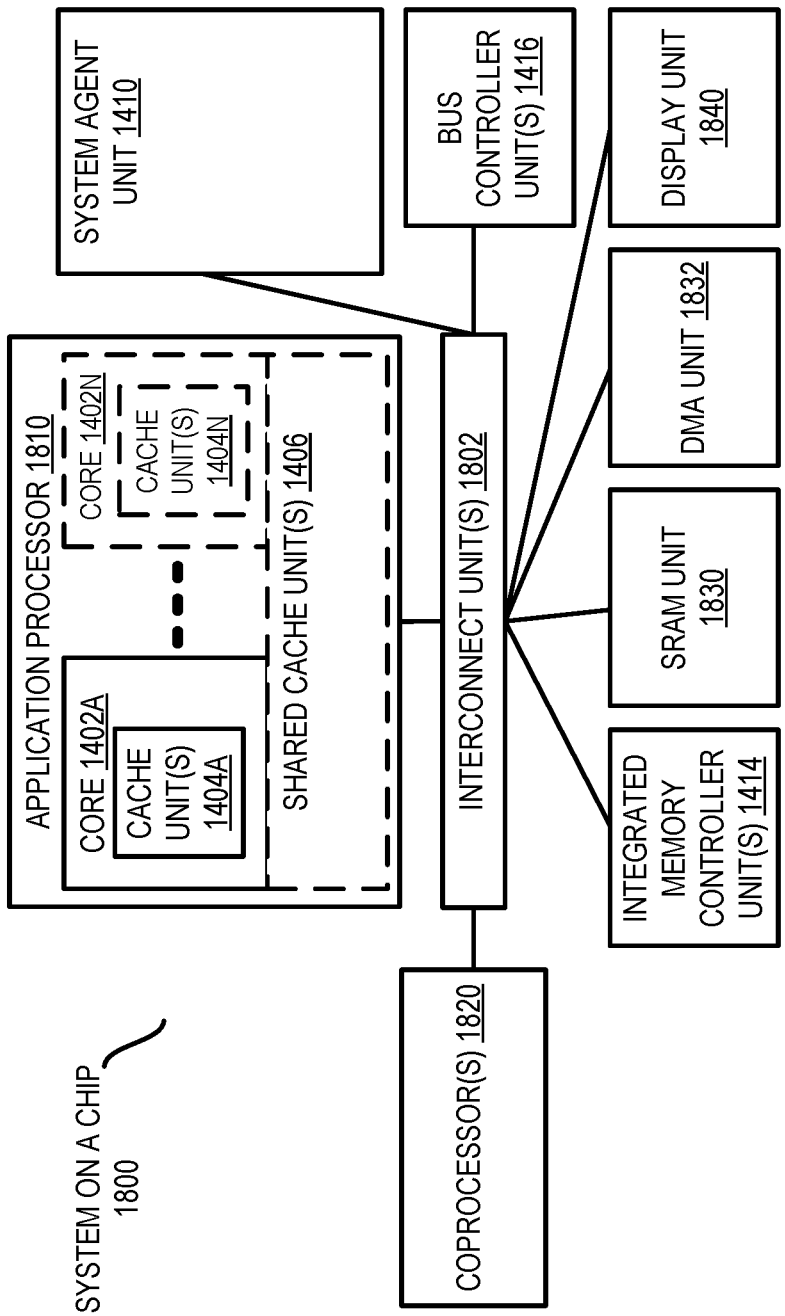

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N, which include cache units 1404A-N, and shared cache unit(s) 1406, a system agent unit 1410, a bus controller unit(s) 1416, an integrated memory controller unit(s) 1414, a set or one or more coprocessors 1820 which may include integrated graphics logic, an image processor, an audio processor, and a video processor, a static random access memory (SRAM) unit 1830, a direct memory access (DMA) unit 1832, and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make, however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

EXAMPLES

Example 1 provides a processor that includes: a fetch circuit to fetch an instruction from an instruction storage, a format of the instruction including an opcode, a first source operand identifier, a second source operand identifier, and a destination operand identifier, wherein each identifier is to identify a location storing a packed data comprising at least one complex number element, wherein each complex number element position includes a real component and an imaginary component, a decode circuit to decode the instruction, a data retrieval circuit to retrieve data associated with the first source operand identifier and the second source operand identifier, and an execution circuit to, for each packed data element position of the identified first and second source operands, cross-multiply the real and imaginary components to generate four products: a product of real components, a product of imaginary components, and two mixed products, generate a complex result by using the four products according to the instruction, and store the complex result to a corresponding position of the identified destination operand.

Example 2 includes the substance of example 1, wherein the instruction comprises a vector-complex fused multiply add (VCFMADD), and wherein the execution circuit is to: generate the real component of the complex result by subtracting the product of imaginary components from the product of real components, generate the imaginary component of the complex result by adding the two mixed products, and accumulate the complex result with a corresponding packed data element position of the destination operand.

Example 3 includes the substance of example 1, wherein the instruction comprises a vector-complex fused conjugated multiply add (VCFCMADD), and wherein the execution circuit is to: generate the real component of the complex result by adding the product of imaginary components and the product of real components, generate the imaginary component of the complex result by subtracting one of the two mixed products from the other of the two mixed products, and accumulate the complex result with a corresponding packed data element position of the destination operand.

Example 4 includes the substance of any one of examples 1-3, wherein the format of the instruction further includes a write mask, each bit of the write mask corresponding to an element position within the identified destination operand, wherein when the bit is set to a first value, a generated real and imaginary component is to be accumulated with the element position of the destination operand, and when the bit is set to a second value, the corresponding packed data element position of the destination operand is to remain unchanged.

Example 5 includes the substance of any one of examples 1-4, wherein the identified first and second source operands comprise at least two complex numbers, and wherein the execution circuit is to generate each corresponding packed data element position of the identified destination operand serially, on one complex number element at a time.

Example 6 includes the substance of any one of examples 1-5, wherein the identified first and second source operands comprise at least two complex numbers, and wherein the execution circuit is to generate every corresponding packed data element position of the identified destination operand in parallel.

Example 7 includes the substance of example 6, wherein the execution circuit is to execute the decoded instruction on the at least two complex numbers in a single clock cycle.

Example 8 includes the substance of example 2, wherein the identified first and second source operands each comprise a single complex number.

Example 9 includes the substance of example 1, wherein a width of the elements of the identified first and second operands and the identified destination operand is determined by a prefix to the opcode.

Example 10 includes the substance of any one of examples 1-9, wherein a number of elements of the identified first and second operands and the identified destination operand is determined by the opcode.

Example 11 provides a method that includes fetching an instruction from an instruction storage, a format of the instruction including an opcode, a first source operand identifier, a second source operand identifier, and a destination operand identifier, wherein each of the identifiers identifies a location storing a packed data comprising at least one complex number, the complex number comprising a pair of values corresponding to a real component and an imaginary component, decoding the instruction, retrieving data associated with the first source operand identifier and the second source operand identifier, and executing the decoded instruction to, for each packed data element position of the identified first and second source operands, cross-multiply the real and imaginary components to generate four products: a product of real components, a product of imaginary components, and two mixed products, generate a complex result by using the four products according to the instruction, and store the complex result to a corresponding position of the identified destination operand.

Example 12 includes the substance of example 11, wherein the instruction comprises a vector-complex fused multiply add (VCFMADD), and wherein executing the decoded instruction is to: generate the real component of the complex result by subtracting the product of imaginary components from the product of real components, generate the imaginary component of the complex result by adding the two mixed products, and accumulate the complex result with the corresponding packed data element position of the destination operand.

Example 13 includes the substance of example 11, wherein the instruction comprises a vector-complex fused conjugated multiply add (VCFCMADD), and wherein executing the decoded instruction is to: generate the real component of the complex result by adding the product of imaginary components and the product of real components, generate the imaginary component of the complex result by subtracting one of the two mixed products from the other of the two mixed products, and accumulate the complex result with a corresponding packed data element position of the destination operand.

Example 14 includes the substance of example 11, wherein each of the identifiers identifies a location storing a packed data comprising at least two complex numbers, and wherein the execution circuit is to generate the four products and accumulate the four products with the real and imaginary components of the at least two complex numbers of the destination operand in parallel.

Example 15 includes the substance of example 14, further comprising executing the decoded instruction in parallel on the at least two complex numbers in a single clock cycle.

Example 16 includes the substance of example 11, wherein the format of the instruction further includes a write mask, each bit of the write mask corresponding to an element position within the identified destination operand, wherein when the bit is set to a first value, a produced real and imaginary component is to be accumulated with the element position of the destination operand, and when the bit is set to a second value, the corresponding packed data element position of the destination operand is to remain unchanged.

Example 17 provides a non-transitory, computer-readable storage medium storing instructions capable of being executed by a processor to perform a method of fetching an instruction from an instruction storage, a format of the instruction including an opcode, a first source operand identifier, a second source operand identifier, and a destination operand identifier, wherein each of the identifiers identifies a location storing a packed data comprising at least one complex number, the complex number comprising a pair of values corresponding to a real component and an imaginary component, decoding the instruction, retrieving data associated with the first source operand identifier and the second source operand identifier, and executing the decoded instruction to, for each packed data element position of the identified first and second source operands, cross-multiply the real and imaginary components to generate four products: a product of real components, a product of imaginary components, and two mixed products, generate a complex result by using the four products according to the instruction, and store the complex result to the corresponding position of the identified destination operand.

Example 18 includes the substance of example 17, wherein each of the identifiers is to identify a location storing a packed data comprising at least one complex number, and wherein the processor to generate the four products and accumulate the four products into the real and imaginary components of the at least two complex number elements of the destination operand in parallel on the at least two complex numbers.

Example 19 includes the substance of example 17, further comprising executing the decoded instruction in parallel on the at least one element in a single clock cycle.

Example 20 includes the substance of any one of example 18, further comprising executing the decoded instruction in parallel on every element of the identified first and second source operands. Although some embodiments disclosed herein involve data handling and distribution in the context of hardware execution circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in machine-executable instructions. The instructions can be used to cause a general-purpose or special-purpose processor that is programmed with the instructions to perform the steps of the at least one embodiment. Embodiments disclosed herein may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program logic to perform the at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

What is claimed is:

1. A processor, comprising:
    a fetch circuit to fetch an instruction specifying an opcode and locations of a first source, a second source, and a destination comprising complex numbers, the opcode indicating an execution circuit is to, for each corresponding pair of complex numbers of the first and second sources, generate a product of their real components, a product of their imaginary components, and two mixed products, use the four products to generate a complex result, and accumulate the complex result with a corresponding complex number of the destination, the instruction further to specify whether to operate in scalar or vector fashion, and whether in series or in parallel;
    a decode circuit to decode the instruction; and
    the execution circuit to, when the instruction calls for scalar operation, execute the instruction on the first and second sources to generate a single complex result, as per the opcode, and accumulate the single complex result with the destination, and, when the instruction calls for vector operation, execute the instruction on each pair of corresponding complex numbers of the first and second sources to generate multiple complex results, either in series or in parallel, as per the opcode, and accumulate each of the multiple complex results with a corresponding destination element.

2. The processor of claim 1, wherein the opcode comprises a vector-complex fused multiply add (VCFMADD), and wherein the execution circuit, when using the four products, is to:
    generate a real component of the multiple complex results by subtracting the product of imaginary components from the product of real components; and
    generate an imaginary component of the multiple complex results by adding the two mixed products.

3. The processor of claim 1, wherein the opcode comprises a vector-complex fused conjugated multiply add (VCFCMADD), and wherein the execution circuit, when using the four products, is to:
    generate a real component of the multiple complex results by adding the product of imaginary components and the product of real components; and
    generate an imaginary component of the multiple complex results by subtracting one of the two mixed products from the other of the two mixed products.

4. The processor of claim 1, wherein the instruction further includes a field to identify a write mask comprising multiple bits, each bit to specify whether a corresponding element of the destination is to be masked, in which case the execution circuit is either to set the element to zero or leave the element unchanged.

5. The processor of claim 1, wherein the execution circuit is to generate the multiple complex results for the first and second sources serially, one at a time.

6. The processor of claim 1, wherein the execution circuit, when performing the vector operation in response to the instruction, is to generate the multiple complex results for the first and second sources in parallel.

7. The processor of claim 6, wherein the execution circuit, when performing the vector operation in response to the instruction, is to generate the multiple complex results for the first and second sources in parallel in a single clock cycle.

8. The processor of claim 1, wherein the instruction calls for the scalar operation, and wherein the first and second sources each comprise a single complex number.

9. The processor of claim 1, wherein a width of each element of the first source, second source, and destination is indicated by a prefix to the opcode.

10. The processor of claim 1, wherein a number of elements of each of the first source, second source, and destination is determined by the opcode, and wherein each of the identified first source, second source, and destination has a same number of elements.

11. A method performed by a processor, the method comprising:
fetching, using a fetch circuit, an instruction specifying an opcode and locations of a first source, a second source, and a destination comprising complex numbers, the opcode indicating an execution circuit is to, for each corresponding pair of complex numbers of the first and second sources, generate a product of their real components, a product of their imaginary components, and two mixed products, use the four products to generate a complex result, and accumulate the complex result with a corresponding complex number of the destination, the instruction further to specify whether to operate in scalar or vector fashion, and whether in series or in parallel;
decoding the instruction; and
executing, using the execution circuit, the instruction, when the instruction calls for scalar operation, on the first and second sources to generate a single complex result, as per the opcode, and accumulate the single complex result with the destination, and, when the instruction calls for vector operation, on each pair of corresponding complex numbers of the first and second sources to generate multiple complex results, either in series or in parallel, as per the opcode, and accumulate each of the multiple complex results with a corresponding destination element.

12. The method of claim 11, wherein the opcode comprises a vector-complex fused multiply add (VCFMADD), and wherein the execution circuit, when using the four products, is to:
generate a real component of the multiple complex results by subtracting the product of imaginary components from the product of real components; and
generate an imaginary component of the multiple complex results by adding the two mixed products.

13. The method of claim 11, wherein the opcode comprises a vector-complex fused conjugated multiply add (VCFCMADD), and the execution circuit, when using the four products, is to:
generate a real component of the multiple complex results by adding the product of imaginary components and the product of real components; and
generate an imaginary component of the multiple complex results by subtracting one of the two mixed products from the other of the two mixed products.

14. The method of claim 11, wherein the execution circuit, when performing the vector operation in response to the instruction, is to generate the multiple complex results of the first and second sources in parallel.

15. The method of claim 14, wherein the execution circuit, when performing the vector operation in response to the instruction, is to generate the multiple complex results of the first and second sources in parallel in a single clock cycle.

16. The method of claim 11, wherein the instruction further includes a field to identify a write mask comprising multiple bits, each bit to specify whether a corresponding element of the destination is to be masked, in which case the execution circuit is either to set the element to zero or leave the element unchanged.

17. A non-transitory computer-readable storage medium, not being a signal, storing code to which a processor is to respond by:
fetching, using a fetch circuit, an instruction specifying an opcode and locations of a first source, a second source, and a destination comprising complex numbers, the opcode indicating an execution circuit is to, for each corresponding pair of complex numbers of the first and second sources, generate a product of their real components, a product of their imaginary components, and two mixed products, use the four products to generate a complex result, and accumulate the complex result with a corresponding complex number of the destination, the instruction further to specify whether to operate in scalar or vector fashion, and whether in series or in parallel;
decoding the instruction; and
executing, using the execution circuit, the instruction, when the instruction calls for scalar operation, on the first and second sources to generate a single complex result, as per the opcode, and accumulate the single complex result with the destination, and, when the instruction calls for vector operation, on each pair of corresponding complex numbers of the first and second sources to generate multiple complex results, either in series or in parallel, as per the opcode, and accumulate each of the multiple complex results with a corresponding destination element.

18. The non-transitory computer-readable storage medium of claim 17, wherein the processor, when performing the vector operation in response to the instruction, is to generate the multiple complex results for at least two elements of the first and second sources in parallel.

19. The non-transitory computer-readable storage medium of claim 18, wherein the processor, when performing the vector operation in response to the instruction, is to generate the multiple complex results for the at least two elements of the first and second sources in parallel in a single clock cycle.

20. The non-transitory computer-readable storage medium of claim 17, wherein the processor, when performing the vector operation in response to the instruction, is to generate the multiple complex results for every element of the first and second sources in parallel in a single clock cycle.

* * * * *